(12) United States Patent
Yin et al.

(10) Patent No.: US 12,244,869 B2
(45) Date of Patent: Mar. 4, 2025

(54) IMAGE RESHAPING IN VIDEO CODING USING RATE DISTORTION OPTIMIZATION

(71) Applicant: DOLBY LABORATORIES LICENSING CORPORATION, San Francisco, CA (US)

(72) Inventors: Peng Yin, Ithaca, NY (US); Fangjun Pu, Sunnyvale, CA (US); Taoran Lu, Santa Clara, CA (US); Tao Chen, Palo Alto, CA (US); Walter J. Husak, Simi Valley, CA (US); Sean Thomas McCarthy, San Francisco, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 166 days.

(21) Appl. No.: 17/707,581

(22) Filed: Mar. 29, 2022

(65) Prior Publication Data

US 2022/0224946 A1 Jul. 14, 2022

Related U.S. Application Data

(63) Continuation of application No. 16/968,574, filed as application No. PCT/US2019/017891 on Feb. 13, 2019, now Pat. No. 11,395,009.

(Continued)

(51) Int. Cl.
*H04N 19/119* (2014.01)
*H04N 19/136* (2014.01)
(Continued)

(52) U.S. Cl.
CPC .......... *H04N 19/85* (2014.11); *H04N 19/119* (2014.11); *H04N 19/136* (2014.11);
(Continued)

(58) Field of Classification Search
CPC .... H04N 19/85; H04N 19/136; H04N 19/147; H04N 19/159; H04N 19/46; H04N 19/82
See application file for complete search history.

(56) References Cited

U.S. PATENT DOCUMENTS 8,982,963 B2 3/2015 Gish
9,076,224 B1 7/2015 Shah
(Continued)

FOREIGN PATENT DOCUMENTS

CN 102685530 B 5/2014
CN 104255033 A 12/2014
(Continued)

OTHER PUBLICATIONS

"Exploratory Test Model for HDR extension of HEVC", MPEG output document, N15792, Oct. 2015, Geneva, CH.
(Continued)

*Primary Examiner* — Dave Czekaj
*Assistant Examiner* — Berteau Joisil

(57) ABSTRACT

Given a sequence of images in a first codeword representation, methods, processes, and systems are presented for image reshaping using rate distortion optimization, wherein reshaping allows the images to be coded in a second codeword representation which allows more efficient compression than using the first codeword representation. Syntax methods for signaling reshaping parameters are also presented.

13 Claims, 14 Drawing Sheets

Related U.S. Application Data

(60) Provisional application No. 62/792,122, filed on Jan. 14, 2019, provisional application No. 62/782,659, filed on Dec. 20, 2018, provisional application No. 62/772,228, filed on Nov. 28, 2018, provisional application No. 62/739,402, filed on Oct. 1, 2018, provisional application No. 62/726,608, filed on Sep. 4, 2018, provisional application No. 62/691,366, filed on Jun. 28, 2018, provisional application No. 62/630,385, filed on Feb. 14, 2018.

(51) Int. Cl.
*H04N 19/147* (2014.01)
*H04N 19/159* (2014.01)
*H04N 19/176* (2014.01)
*H04N 19/46* (2014.01)
*H04N 19/85* (2014.01)
*H04N 19/117* (2014.01)
*H04N 19/82* (2014.01)

(52) U.S. Cl.
CPC ......... *H04N 19/147* (2014.11); *H04N 19/159* (2014.11); *H04N 19/176* (2014.11); *H04N 19/46* (2014.11); *H04N 19/117* (2014.11); *H04N 19/82* (2014.11)

(56) References Cited

U.S. PATENT DOCUMENTS

| | | | |
|---|---|---|---|
| 9,549,207 | B2 | 1/2017 | Su |
| 9,584,811 | B2 | 2/2017 | Su |
| 10,015,491 | B2 | 7/2018 | Su |
| 10,165,275 | B2 | 12/2018 | Lu |
| 10,542,289 | B2 | 1/2020 | Yin |
| 2011/0243232 | A1 | 10/2011 | Alshina |
| 2014/0092993 | A1 | 4/2014 | Wang |
| 2014/0294061 | A1 | 10/2014 | Zhang |
| 2016/0379346 | A1 | 12/2016 | Liu |
| 2017/0085879 | A1 | 3/2017 | Minoo |
| 2017/0214916 | A1 | 7/2017 | Lu |
| 2017/0221189 | A1 | 8/2017 | Kheradmand |
| 2018/0041759 | A1 | 2/2018 | Froehlich |
| 2019/0014331 | A1* | 1/2019 | Li ................... H04N 19/117 |
| 2020/0186839 | A1* | 6/2020 | Hiron ............... H04N 19/186 |
| 2020/0267392 | A1* | 8/2020 | Lu .................... H04N 19/176 |

FOREIGN PATENT DOCUMENTS

| | | |
|---|---|---|
| CN | 104885457 A | 9/2015 |
| CN | 105324997 A | 2/2016 |
| EP | 3226563 | 3/2017 |
| EP | 3244616 A1 | 11/2017 |
| JP | 2015508589 A | 3/2015 |
| JP | 2016501481 A | 1/2016 |
| JP | 7353401 B2 | 9/2023 |
| KR | 20090038374 A | 4/2009 |
| RU | 2504011 | 1/2014 |
| WO | 2005022919 A1 | 3/2005 |
| WO | 2016153896 A1 | 9/2016 |
| WO | 201616423 | 10/2016 |
| WO | 2017011636 | 1/2017 |
| WO | 2017019818 A1 | 2/2017 |
| WO | 2017024042 A2 | 2/2017 |
| WO | 2017053432 | 3/2017 |
| WO | 2017114016 A1 | 7/2017 |
| WO | 2017165494 A2 | 9/2017 |
| WO | 2017194405 A1 | 11/2017 |
| WO | 2017196869 A1 | 11/2017 |
| WO | 2019160986 A1 | 8/2019 |

OTHER PUBLICATIONS

Bross, B. et al "Versatile Video Coding (Draft 3)", JVET output document, uploaded Jan. 8, 2019.

HEVC specification, https://www.itu.int/rec/T-REC-H.265, Nov. 2019.

ITU-R BT. 2100 "Image Parameter Values for High Dynamic Range Television for Use in Production and International Programme Exchange" ITU, Jul. 2016.

ITU-R BT.2020 "Parameter Values for Ultra-High Definition Television Systems for Production and International Programme Exchange" Aug. 2012.

ITU-R BT.709-5 "Parameter Values for the HDTV Standards for Production and International Programme Exchange" Apr. 2002.

Larson, Gregory Ward, et al."A Visibility Matching Tone Reproduction Operator for High Dynamic Range Scenes" IEEE Transactions on Visualization and Computer Graphics, vol. 3, No. 4, Oct.-Dec. 1997, pp. 291-306.

Pu, F. et al "CE12-4: SDR In-Loop Reshaping" JVET, 12th Meeting: Macao, Oct. 2018, pp. 1-8.

Pu, F. et al "In-Loop Reshaping for SDR Video" JVET of ITU-T SG 16 WP3, Jul. 2018.

SMPTE 2084:2014 "High Dynamic Range Electro-Optical Transfer Function of Mastering Reference Displays" Aug. 16, 2014.

Andersson K., Combined Intra Inter Prediction Coding Mode, Oct. 20, 2006, 5 pages, Video Coding Experts Group of ITU-T SG.16, VCEG-AD11, Oct. 20, 2006, Hangzhou, CN.

* cited by examiner

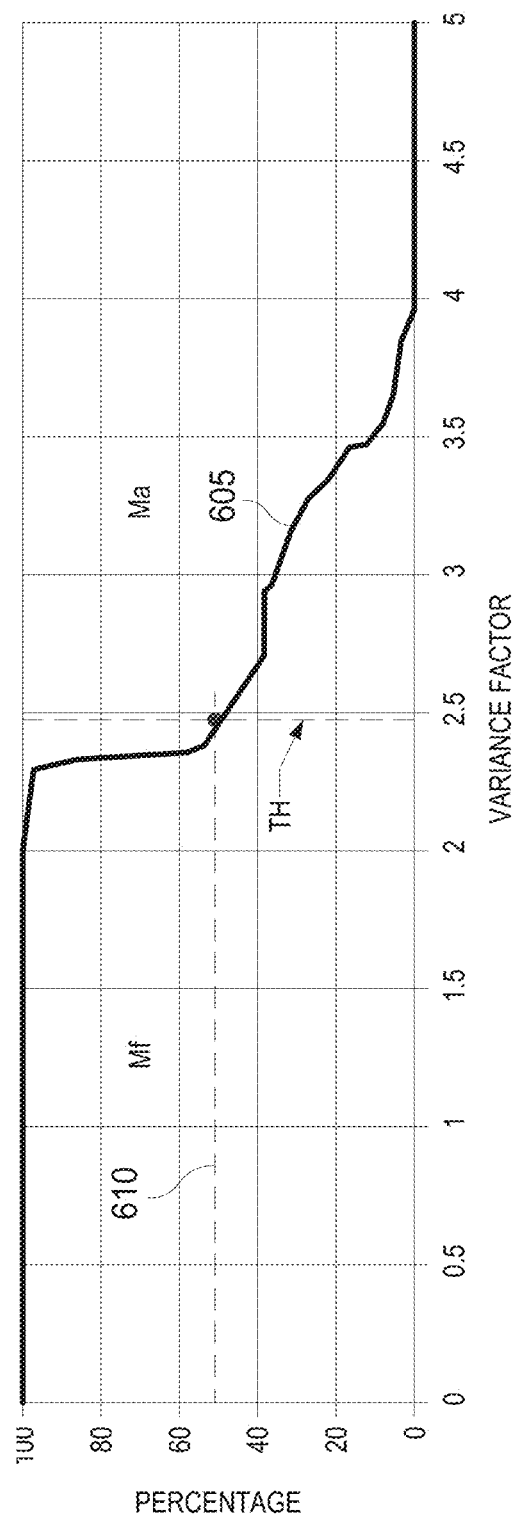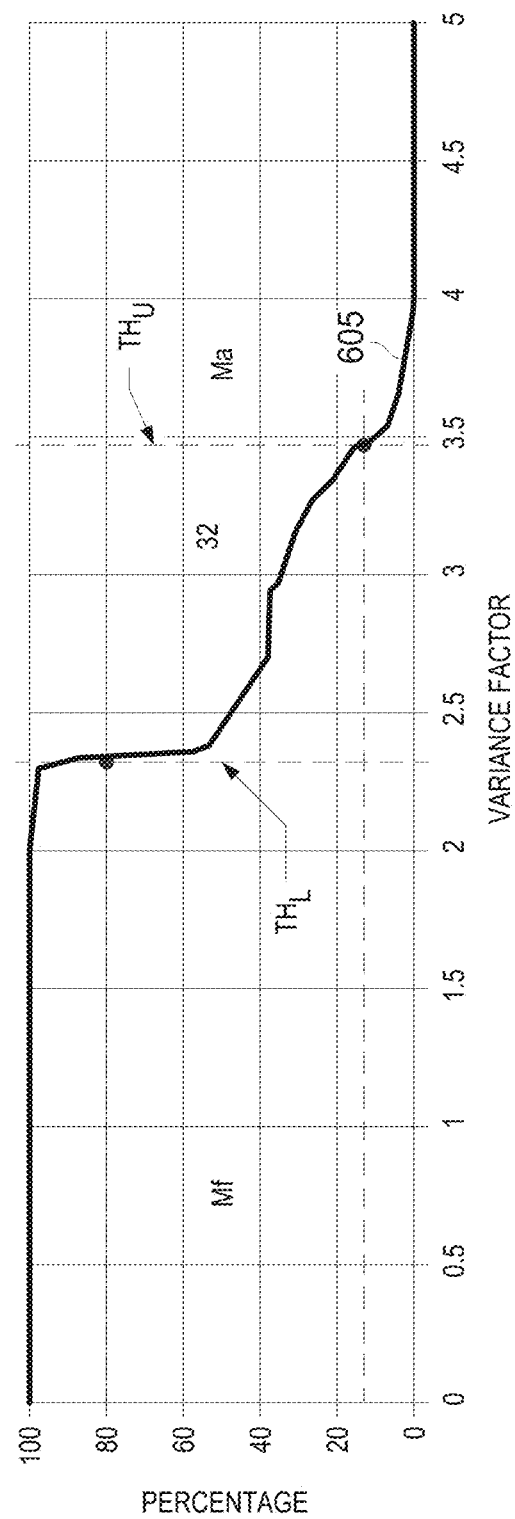

IMAGE RESHAPING IN VIDEO CODING USING RATE DISTORTION OPTIMIZATION

CROSS-REFERENCE TO RELATED APPLICATIONS

This application is a continuation of U.S. patent application Ser. No. 16/968,574, filed Aug. 8, 2020, which is the national stage entry for PCT Application No. PCT/US2019/017891, filed Feb. 13, 2019, which claims the benefit of priority to U.S. Provisional Patent Application No. 62/792,122, filed Jan. 14, 2019,
U.S. Provisional Patent Application No. 62/782,659, filed Dec. 20, 2018,
U.S. Provisional Patent Application No. 62/772,228, filed Nov. 28, 2018,
U.S. Provisional Patent Application No. 62/739,402, filed Oct. 1, 2018,
U.S. Provisional Patent Application No. 62/726,608, filed Sep. 4, 2018,
U.S. Provisional Patent Application No. 62/691,366, filed Jun. 28, 2018, and
U.S. Provisional Patent Application No. 62/630,385, filed Feb. 14, 2018,
each of which is incorporated herein by reference in its entirety.

TECHNOLOGY

The present invention relates generally to images and video coding. More particularly, an embodiment of the present invention relates to image reshaping in video coding.

BACKGROUND

In 2013, the MPEG group in the International Standardization Organization (ISO), jointly with the International Telecommunications Union (ITU), released the first draft of the HEVC (also known as H.265) video coding standard (Ref. [4]). More recently, the same group has released a call for evidence to support the development of a next generation coding standard that provides improved coding performance over existing video coding technologies.

As used herein, the term 'bit depth' denotes the number of pixels used to represent one of the color components of an image. Traditionally, images were coded at 8-bits, per color component, per pixel (e.g., 24 bits per pixel); however, modern architectures may now support higher bit depths, such as 10 bits, 12 bits or more.

In a traditional image pipeline, captured images are quantized using a non-linear opto-electronic function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT. 2020, the "PQ" (perceptual quantization) curve described in SMPTE ST 2084, and the "HybridLog-gamma" or "HLG" curve described in Rec. ITU-R BT. 2100.

As used herein, the term "forward reshaping" denotes a process of sample-to-sample or codeword-to-codeword mapping of a digital image from its original bit depth and original codewords distribution or representation (e.g., gamma or PQ or HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the reshaped signal, the receiver may apply an "inverse reshaping function" to restore the signal to its original codeword distribution. As appreciated by the inventors here, as development begins for the next generation of a video coding standard, improved techniques for the integrated reshaping and coding of images are desired. Methods of this invention can be applicable to a variety of video content, including, but not limited, to content in standard dynamic range (SDR) and/or high-dynamic range (HDR).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIGS. 6A, 6B, 6C, and 6D depict example data plots for deriving reshaping thresholds according to the process depicted in FIG. 5 and an embodiment of this invention.

DESCRIPTION OF EXAMPLE EMBODIMENTS

Figure 1A:
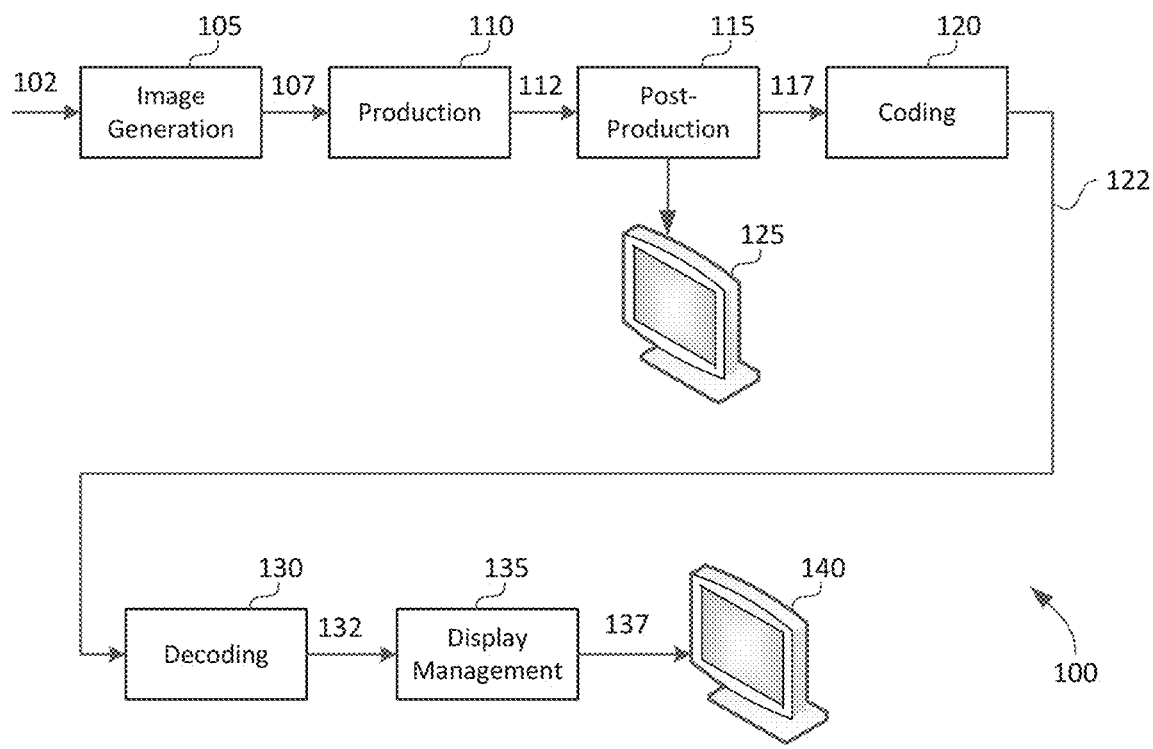
FIG. 1A depicts an example process for a video delivery pipeline.

Signal reshaping and coding techniques for compressing images using rate-distortion optimization (RDO) are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to signal reshaping and coding for video. In an encoder, a processor receives an input image in a first codeword representation to be reshaped to a second codeword representation, wherein the second codeword representation allows for a more efficient compression than the first codeword representation, and generates a forward reshaping function mapping pixels of the input image to a second codeword representation, wherein to generate the forward reshaping function, the encoder: divides the input image into multiple pixel regions, assigns each of the pixel regions to one of multiple codeword bins according to a first luminance characteristic of each pixel region, computes a bin metric for each one of the multiple codeword bins according to a second luminance characteristic of each of the pixel regions assigned to each codeword bin, allocates a number of codewords in the second codeword representation to each codeword bin according to the bin metric of each codeword bin and a rate distortion optimization criterion, and generates the forward reshaping function in response to the allocation of codewords in the second codeword representation to each of the multiple codeword bins.

In another embodiment, in a decoder, a processor receives coded bitstream syntax elements characterizing a reshaping model, wherein the syntax elements include one or more of a flag indicating a minimum codeword bin index value to be used in a reshaping construction process, a flag indicating a maximum codeword bin index value to be used in a reshaping construction process, a flag indicating a reshaping model profile type, wherein the model profile type is associated with default bin-relating parameters, including bin importance values, or a flag indicating one or more delta bin importance values to be used to adjust the default bin importance values defined in the reshaping model profile. The processor determines based on the reshaping model profile the default bin importance values for each bin and an allocation list of a default numbers of codewords to be allocated to each bin according to the bin's importance value. Then, for each codeword bin, the processor:
  determines its bin importance value by adding its default bin importance value to its delta bin importance value;
  determines the number of codewords to be allocated to the codeword bin based on the bin's bin importance value and the allocation list; and
  generates a forward reshaping function based on the number of codewords allocated to each codeword bin.

In another embodiment, in a decoder, a processor receives a coded bitstream comprising one or more coded reshaped images in a first codeword representation and metadata related to reshaping information for the coded reshaped images. The processor generates based on the metadata related to the reshaping information, an inverse reshaping function and a forward reshaping function, wherein the inverse reshaping function maps pixels of the reshaped image from the first codeword representation to a second codeword representation, and the forward reshaping function maps pixels of an image from the second codeword representation to the first codeword representation. The processor extracts from the coded bitstream a coded reshaped image comprising one or more coded units, wherein for one or more coded units in the coded reshaped image:
  for a reshaped intra-coded coding unit (CU) in the coded reshaped image, the processor:
    generates first reshaped reconstructed samples of the CU based on reshaped residuals in the CU and first reshaped prediction samples;
    generates a reshaped loop filter output based on the first reshaped reconstructed samples and loop-filter parameters;
    applies the inverse reshaping function to the reshaped loop filter output to generate decoded samples of the coding unit in the second codeword representation; and
    stores the decoded samples of the coding unit in the second codeword representation in a reference buffer;
  for a reshaped inter-coded coding unit in the coded reshaped image, the processor:
    applies the forward reshaping function to prediction samples stored in the reference buffer in the second codeword representation to generate second reshaped prediction samples;
    generates second reshaped reconstructed samples of the coding unit based on reshaped residuals in the coded CU and the second reshaped prediction samples;
    generates a reshaped loop filter output based on the second reshaped reconstructed samples and loop-filter parameters;
    applies the inverse reshaping function to the reshaped loop filter output to generate samples of the coding unit in the second codeword representation; and
    stores the samples of the coding unit in the second codeword representation in a reference buffer. Finally, the processor generates a decoded image based on the stored samples in the reference buffer.

In another embodiment, in a decoder, a processor receives a coded bitstream comprising one or more coded reshaped images in an input codeword representation and reshaping metadata (207) for the one or more coded reshaped images in the coded bitstream. The processor generates a forward reshaping function (282) based on the reshaping metadata, wherein the forward reshaping function maps pixels of an image from a first codeword representation to the input codeword representation. The processor generates an inverse reshaping function (265-3) based on the reshaping metadata or the forward reshaping function, wherein the inverse reshaping function maps pixels of a reshaped image from the input codeword representation to the first codeword representation. The processor extracts from the coded bitstream a coded reshaped image comprising one or more coded units, wherein:
  for an intra-coded coding unit (intra-CU) in the coded reshaped image, the processor:
    generates reshaped reconstructed samples of the intra-CU (285) based on reshaped residuals in the intra-CU and intra-predicted reshaped prediction samples;

applies the inverse reshaping function (265-3) to the reshaped reconstructed samples of the intra-CU to generate decoded samples of the intra-CU in the first codeword representation;

applies a loop filter (270) to the decoded samples of the intra-CU to generate output samples of the intra-CU; and stores the output samples of the intra-CU in a reference buffer;

for an inter-coded CU (inter-CU) in the coded reshaped image, the processor:

applies the forward reshaping function (282) to inter-prediction samples stored in the reference buffer in the first codeword representation to generate reshaped prediction samples for the inter-CU in the input codeword representation;

generates reshaped reconstructed samples of the inter-CU based on reshaped residuals in the inter-CU and the reshaped prediction samples for the inter-CU;

applies the inverse reshaping function (265-3) to the reshaped reconstructed samples of the inter-CU to generate decoded samples of the inter-CU in the first codeword representation;

applies the loop filter (270) to the decoded samples of the inter-CU to generate output samples of the inter-CU; and stores the output samples of the inter-CU in the reference buffer; and generates a decoded image in the first codeword representation based on output samples in the reference buffer.

Example Video Delivery Processing Pipeline

FIG. 1A depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creators creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Reshaping

Figure 1B:
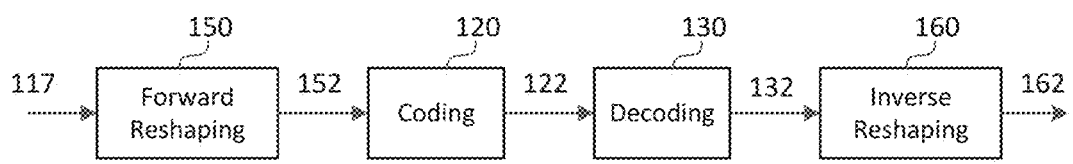
FIG. 1B depicts an example process for data compression using signal reshaping according to prior art.

FIG. 1B depicts an example process for signal reshaping according to prior art [2]. Given input frames (117), a forward reshaping block (150) analyzes the input and the coding constrains and generates codeword mapping functions which map input frames (117) to re-quantized output frames (152). For example, input (117) may be encoded according to certain electro-optical transfer function (EOTF) (e.g., gamma). In some embodiments, information about the reshaping process may be communicated to downstream devices (such as decoders) using metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Following coding (120) and decoding (130), decoded frames (132) may be processed by a backward (or inverse) reshaping function (160), which converts the re-quantized frames (132) back to the original EOTF domain (e.g., gamma), for further downstream processing, such as the display management process (135) discussed earlier. In some embodiments, the backward reshaping function (160) may be integrated with a de-quantizer in decoder (130), e.g., as part of the de-quantizer in an AVC or HEVC video decoder.

As used herein, the term "reshaper" may denote a forward or an inverse reshaping function to be used when coding and/or decoding digital images. Examples of reshaping functions are discussed in Ref. [2]. In Ref. [2], an in-loop block-based image reshaping method for high dynamic range video coding was proposed. That design allows block-based reshaping inside the coding loop, but at a cost of increased complexity. To be specific, the design requires maintaining two sets of decoded-image buffers: one set for inverse-reshaped (or non-reshaped) decoded pictures, which can be used for both prediction without reshaping and for output to a display, and another set for forward-reshaped decoded pictures, which is used only for prediction with reshaping. Though forward-reshaped decoded pictures can be computed on the fly, the complexity cost is very high, especially for inter-prediction (motion compensation with sub-pixel interpolation). In general, display-picture-buffer (DPB) management is complicated and requires very careful attention, thus, as appreciated by the inventors, simplified methods for coding video are desired.

In Ref. [6], additional reshaping-based codec architectures were presented, including an external, out-of-loop reshaper, an architecture with an in-loop intra only reshaper, an architecture with an in-loop reshaper for prediction residuals, and a hybrid architecture which combines both intra, in-loop, reshaping and inter, residual reshaping. The main goal of those proposed reshaping architectures is to improve subjective visual quality. Thus, many of these approaches will yield worse objective metrics, in particular the well-known Peak Signal to Noise Ratio (PSNR) metric.

In this invention, a new reshaper is proposed based on Rate-Distortion Optimization (RDO). In particular, when the targeted distortion metric is MSE (Mean Square Error), the proposed reshaper will improve both subjective visual quality and well-used objective metrics based on PSNR, Bjontegaard PSNR (BD-PSNR), or Bjontegaard Rate (BD-Rate). Note that any of the proposed reshaping architectures, without loss of generality, may be applied for the luminance component, one or more of the chroma components, or a combination of luma and chroma components.

Reshaping Based on Rate-Distortion Optimization

Consider a reshaped video signal represented by a bit-depth of B bits in a color component (e.g., B=10 for Y, Cb, and/or Cr), thus there are a total of $2^B$ available codewords. Consider dividing the desired codeword range $[0\ 2^B]$ into N segments or bins, and let $M_k$ represents the number of codewords in the k-th segment or bin, after a reshaping mapping, so that given a target bit rate R, the distortion D between the source picture and the decoded or reconstructed picture is minimal. Without loss of generality, D may be expressed as a measure of the sum of square error (SSE) between corresponding pixel values of the source input (Source(i,j)) and the reconstructed picture (Recon(i,j))

$$D=SSE=\Sigma_{i,j}\text{Diff}(i,j)^2, \qquad (1)$$

where $$\text{Diff}(i,j)=\text{Source}(i,j)-\text{Recon}(i,j).$$

The optimization reshaping problem may be re-written as: find $M_k$ (k=0, 1, ..., N−1), such that given a bitrate R, D is minimal, where $\Sigma_{k=0}^{N-1} M_k \leq 2^B$.

Various optimization methods can be used to find a solution, but the optimal solution could be very complicated for real-time encoding. In this invention, a suboptimal, but more practical analytical solution is proposed.

Without losing generality, consider an input signal represented by a bit depth of B bits (e.g., B=10), where the codewords are uniformly divided into N bins (e.g., N=32). By default, each bin is assigned to $M_a=2^B/N$ codewords (e.g., for N=32 and B=10, $M_a$=32). Next, a more efficient codeword allocation, based on RDO, will be demonstrated through an example.

As used herein, the term "narrow range" [CW1, CW2] denotes a continuous range of codewords between codewords CW1 and CW2 which is a subset of the full dynamic range $[0\ 2^B-1]$. For example, in an embodiment, a narrow range may be defined as $[16*2^{(B-8)}, 235*2^{(B-8)}]$, (e.g., for B=10, the narrow range comprises values [64 940]). Assuming the bit depth of the output signal is $B_o$, if the dynamic range of an input signal is within a narrow range, then, in what will be denoted as "default" reshaping, one can stretch the signal into the full range $[0\ 2^{Bo}-1]$. Then, each bin will have about $M_f$=CEIL$((2^{Bo}/(CW2-CW1))*M_a)$ codewords, or, for our example, if $B_o$=B=10, $M_f$=CEIL((1024/(940−64))*32)=38 codewords, where CEIL(x) denotes the ceiling function, which maps x to the least integer that is greater or equal to x. Without losing generality, in the examples below, for simplicity, it is assumed that $B_o$=B.

For the same quantization parameter (QP), the effect of increasing the number of codewords in a bin is equivalent to allocating more bits to code the signal within the bin, therefore it is equivalent to reducing SSE or improving PSNR; however, a uniform increase of codeword allocation in each bin may not give better results than coding without reshaping, because PSNR gain may not beat the increase of bitrate, i.e., this is not a good tradeoff in terms of RDO. Ideally, one would like to assign more codewords only to the bins which yield the best tradeoff on RDO, i.e., generate significant SSE decrease (PSNR increase) at the expense of little amount of bitrate increase.

In an embodiment, RDO performance is improved through an adaptive piecewise reshaping mapping. The method can be applied to any type of a signal, including standard dynamic range (SDR) and high-dynamic range (HDR) signals. Using the previous simple case as an example, the goal of this invention is to assign either $M_a$ or $M_f$ codewords for each codeword segment or codeword bin.

At an encoder, given N codeword bins for the input signal, the average luminance variance of each bin can be approximated as following:

Initialize to zero the sum of block variance ($\text{var}_{bin}(k)$) and a counter ($c_{bin}(k)$) for each bin, e.g., $\text{var}_{bin}(k)$=0 and $c_{bin}(k)$=0, for k=0, 1, ..., N−1.

Divide the picture into L*L non-overlapped blocks (e.g., L=16)

For each picture block, compute the luma mean of the block and the luma variance of the block i (e.g., Luma_mean(i) and Luma_var(i))

Based on the mean luma of the block, assign that block to one of the N bins. In an embodiment, if Luma_mean(i) is within the k-th segment in the input dynamic range, the total bin luminance variance for the k-th bin is incremented by the luma variance of the newly assigned block, and the counter for that bin is increased by one. That is, if the i-th pixel region belongs to the k-th bin:

$$\text{var}_{bin}(k)=\text{var}_{bin}(k)+\text{Luma\_var}(i);$$

$$c_{bin}(k)=c_{bin}(k)+1. \qquad (2)$$

For each bin, compute the average luminance variance for that bin by dividing the sum of the block variances in that bin by the counter, assuming the counter is not equal to 0; or if $c_{bin}(k)$ is not 0, then $$\text{var}_{bin}(k)=\text{var}_{bin}(k)/c_{bin}(k) \qquad (3)$$

A person skilled in the art would appreciate that one may apply alternative metrics than luminance variance to characterize the sub-blocks. For example, one may use the standard deviation of luminance values, a weighted luminance variance or luminance value, a peak luminance, and the like.

In an embodiment, the following pseudo code depicts an example on how an encoder may adjusts the bin allocation using the computed metrics for each bin.

For the k-th bin, (4)

if no pixels are in the bin $M_k = 0$;

else if $\text{var}_{bin}(k) < TH_U$ $M_k = M_f$;

else $M_k = M_a$; // (note: this is to make sure that each bin will have at least $M_a$ codewords // Alternatively, one may also allocate $M_a + 1$ codewords)

end where $TH_U$ denotes a predetermined upper threshold.

In another embodiment, the allocation may be performed as follows:

For the $k$-th bin, (5)

if no pixels are in the bin $M_k = 0$;

else if $TH_0 < \text{var}_{bin}(k) < TH_1$ $M_k = M_f$;

else $M_k = M_a$;

end where $TH_0$ and $TH_1$ denote predetermined lower and upper thresholds.

In another embodiment

For the $k$-th bin, (6)

if no pixels are in the bin $M_k = 0$;

else if $\text{var}_{bin}(k) > TH_L$ $M_k = M_f$;

else $M_k = M_a$;

end where $TH_L$ denotes a predetermined lower threshold.

The above examples show how to select the number of codewords for each bin from two pre-select numbers $M_f$ and $M_a$. Thresholds (e.g., $TH_U$ or $TH_L$) can be determined based on optimizing the rate distortion, e.g., through exhaustive search. Thresholds may also be adjusted based on the quantization parameter values (QP). In an embodiment, for B=10, thresholds may range between 1,000 and 10,000.

In an embodiment, to expedite processing, a threshold may be determined from a fixed set of values, say, {2,000, 3,000, 4,000, 5,000, 6,000, 7,000}, using a Lagrangian optimization method. For example, for each TH(i) value in the set, using pre-defined training clips, one can run compression tests with fixed QP, and compute values of an objective function J defined as $$J(i) = D + \lambda R. \quad (7)$$

Then, the optimal threshold value may be defined as the TH(i) value in the set for which J(i) is minimum.

In a more general example, one can predefine a look-up table (LUT). For example, in Table 1, the first row defines a set of thresholds dividing the full range of possible bin metrics (e.g., $\text{var}_{bin}(k)$ values) into segments, and the second row defines the corresponding number of codewords (CW) to be assigned in each segment. In an embodiment, one rule to build such a LUT is: if the bin variance is too big, one may need to spend lots of bits to reduce the SSE, therefore one can assign codeword (CW) values less than $M_a$. If the bin variance is very small, one can assign a CW value larger than $M_a$.

TABLE 1

Example LUT of codeword allocation based on bin variance thresholds

| $TH_0$ | ... | $TH_{p-1}$ | $TH_p$ | $TH_{p+1}$ | ... | $TH_{q-1}$ | |
|---|---|---|---|---|---|---|---|
| $CW_0$ | ... | $CW_{p-1}$ | $CW_p$ | $CW_{p+1}$ | ... | $CW_{q-1}$ | $CW_q$ |

Using Table 1, the mapping of thresholds into codewords may be generated as follows:

For the $k$-th bin, (8)

if there are no pixels in the bin $M_k = 0$;

else if $\text{var}_{bin}(k) < TH_0$ $M_k = CW_0$;

else if $TH_0 < \text{var}_{bin}(k) < TH_1$ $M_k = CW_1$;

...

else if $TH_{p-1} < \text{var}_{bin}(k) < TH_p$ $M_k = CW_p$;

...

else if $\text{var}_{bin}(k) > TH_{q-1}$ $M_k = CW_q$;

end

For example, given two thresholds and three codeword allocations, for B=10, in an embodiment, $TH_0$=3,000, $CW_0$=38, $TH_1$=10,000, $CW_1$=32, and $CW_2$=28.

In another embodiment, the two thresholds $TH_0$ and $TH_1$ may be selected as follows: a) consider $TH_1$ to be a very large number (even infinity) and select $TH_0$ from a set of predetermined values, e.g., using the RDO optimization in equation (7). Given $TH_0$, now define a second set of possible values for $TH_1$, e.g., set {10,000, 15,000, 20,000, 25,000, 30,000}, and apply equation (7) to identify the optimum value. The approach can be iteratively performed with a limited numbers of threshold values or until it converges.

One may note that after allocating codewords to bins according to any of the schemes defined earlier, either the sum of $M_k$ values may exceed the maximum of available codewords ($2^B$) or there are unused codewords. If there are unused codewords, one may simply decide to do nothing, or allocate them to specific bins. On the other hand, if the algorithm assigned more codewords than available, then one may want to readjust the $M_k$ values, e.g., by renormalizing the CW values. Alternatively, one may generate the forward reshaping function using the existing $M_k$ values, but then readjust the output value of the reshaping function by scaling with $(\Sigma_k M_k)/2^B$. Examples of codeword reallocation techniques are also described in Ref. [7].

Figure 4:
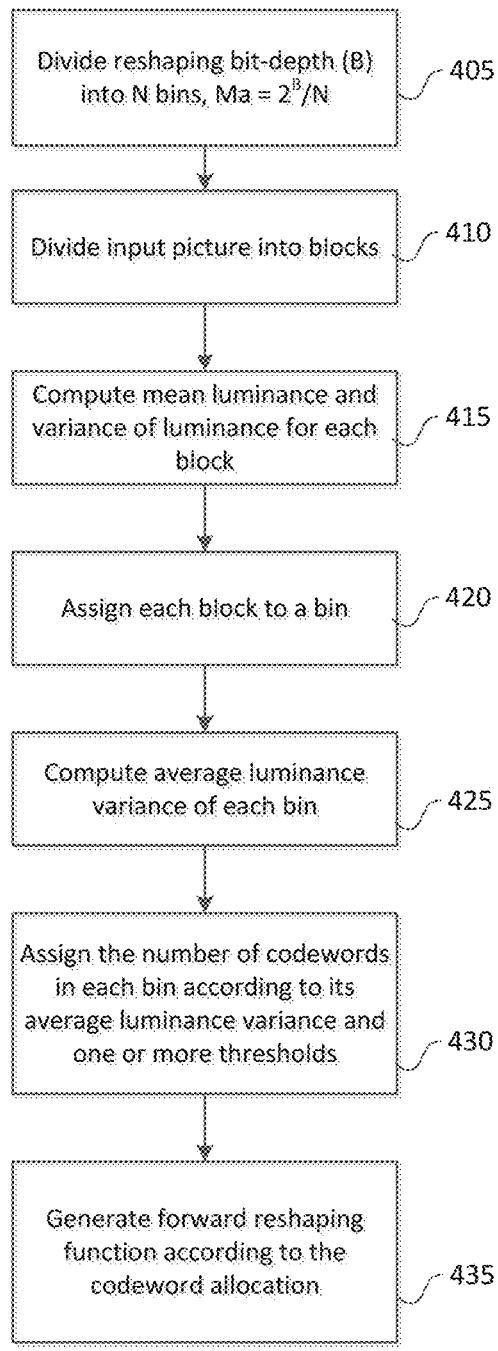
FIG. 4 depicts an example process for reassigning codewords in the reshaped domain according to an embodiment of this invention.

FIG. 4 depicts an example process for allocating codewords into the reshaping domain according to the RDO technique described earlier. In step 405, the desired reshaped dynamic range is divided into N bins. After the input image is divided into non-overlapping blocks (step 410), for each block:

Step 415 computes its luminance characteristics (e.g., mean and variance)

Step 420 assigns each image block to one of the N bins

Step 425 computes the average luminance variance in each bin

Given the values computed in step 425, in step 430, each bin is assigned a number of codewords according to one or more thresholds, for example, using any of the codeword allocation algorithms depicted in equations (4) to (8). Finally, in step (435), the final codeword allocation may be used to generate a forward reshaping functions and/or an inverse reshaping function.

In an embodiment, as an example and without limitation, the forward LUT (FLUT) can be built using the following C code.

```
tot_cw = 2^B;
hist_lens = tot_cw/N;
for (i = 0; i < N; i++)
    {
    double temp = (double) M[i] / (double)hist_lens;  //M[i] corresponds to M_k
    for (j = 0; j < hist_lens; j++)
        {
        CW_bins_LUT_all[i*hist_lens + j] = temp;
        }
    }
Y_LUT_all[0] = CW_bins_LUT_all[0];
for (i = 1; i < tot_cw; i++)
    {
    Y_LUT_all[i] = Y_LUT_all [i - 1] + CW_bins_LUT_all[i];
    }
for (i = 0; i < tot_cw; i++)
    {
    FLUT[i] = Clip3(0, tot_cw - 1, (Int)(Y_LUT_all[i] + 0.5));
    }
```

In an embodiment, the inverse LUT can be built as follows:

```
low = FLUT[0];
high = FLUT[tot_cw - 1];
first = 0;
last = tot_cw - 1;
for ( i = 1; i < tot_cw; i++)
    if (FLUT[0] < FLUT[i])
        {
        first = i - 1;
        break;
        }
for (i = tot_cw - 2; i >= 0; i--)
    if (FLUT[tot_cw - 1] > FLUT[i])
        {
        last = i + 1;
        break;
        }
for (i = 0; i < tot_cw; i++)
    {
    if (i <= low)
        {
        ILUT[i] = first;
        }
    else if (i >= high)
        {
        ILUT[i] = last;
        }
    else
        {
        for (j = 0; j < tot_cw - 1; j++)
            if (FLUT[j] >= i)
                {
                ILUT[i] = j;
                break;
                }
        }
    }
```

Syntax-wise, one can re-use the syntax proposed in previous applications, such as the piecewise polynomial mode or parametric model in References [5] and [6]. Table 2 shows such an example for N=32 for equation (4).

TABLE 2

Syntax of reshaping using a first parametric model

| | Descriptor |
|---|---|
| reshaping_model( ) { | |
|   reshaper_model_profile_type | ue(v) |

TABLE 2-continued

Syntax of reshaping using a first parametric model

| | Descriptor |
|---|---|
| reshaper_model_scale_idx | u(2) |
| reshaper_model_min_bin_idx | u(5) |
| reshaper_model_max_bin_idx | u(5) |
| for ( i = reshaper_model_min_bin_idx; i <= reshaper_model_max_bin_idx; i++ ) { | |
|   reshaper_model_bin_profile_delta [ i ] | u(1) |
| } | |
| } | | where, reshaper_model_profile_type specifies the profile type to be used in the reshaper construction process. A given profile may provide information about default values being used, such as the number of bins, default bin importance or priority values, and default codeword allocations (e.g., $M_a$ and/or $M_f$ values).

reshaper_model_scale_idx specifies the index value of a scale factor (denoted as ScaleFactor) to be used in the reshaper construction process. The value of the Scale-Factor allows for improved control of the reshaping function for improved overall coding efficiency.

reshaper_model_min_bin_idx specifies the minimum bin index to be used in the reshaper construction process. The value of reshaper_model_min_bin_idx shall be in the range of 0 to 31, inclusive.

reshaper_model_max_bin_idx specifies the maximum bin index to be used in the reshaper construction process. The value of reshaper_model_max_bin_idx shall be in the range of 0 to 31, inclusive.

reshaper_model_bin_profile_delta[i] specifies the delta value to be used to adjust the profile of the i-th bin in the reshaper construction process. The value of reshaper_model_bin_profile_delta i shall be in the range of 0 to 1, inclusive.

Table 3 depicts another embodiment with an alternative, more efficient, syntax representation.

TABLE 3

Syntax of reshaping using a second parametric model

| | Descriptor |
|---|---|
| reshaping_model( ) { | |
|   reshaper_model_profile_type | ue(v) |
|   reshaper_model_scale_idx | u(2) |
|   reshaper_model_min_bin_idx | ue(v) |
|   reshaper_model_delta_max_bin_idx | ue(v) |
|   reshaper_model_num_cw_minus1 | u(1) |
|   for ( i = 0; i < reshaper_model_num_cw_minus1 + 1; i++) { | |
|     reshaper_model_delta_abs_CW [ i ] | u(5) |
|     if ( reshaper_model_delta_abs_CW > 0 ) | |
|       reshaper_model_delta_sign_CW [ i ] | u(1) |
|   } | |
|   for ( i = reshaper_model_min_bin_idx; i <= reshaper_model_max_bin_idx; i++ ) { | |
|     reshaper_model_bin_profile_delta [ i ] | u(v) |
|   } | |
| } | | where,
  reshaper_model_delta_max_bin_idx is set equal to the maximum allowed bin index (e.g., 31) minus the maximum bin index to be used in the reshaper construction process.
  reshaper_model_num_cw_minus1 plus 1 specifies the number of codewords to be signalled.
  reshaper_model_delta_abs_CW[i] specifies the i-th absolute delta codeword value.
  reshaper_model_delta_sign_CW[i] specifies the sign for the i-th delta codeword.
Then:

reshaper_model_delta_CW[$i$]=(1−2*reshaper_model_delta_sign_CW[$i$])*reshaper_model_delta_abs_CW[$i$];

reshaper_model_CW[$i$]=32+reshaper_model_delta_CW[$i$].

reshaper_model_bin_profile_delta[i] specifies the delta value to be used to adjust the profile of the i-th bin in the reshaper construction process. The value of reshaper_model_bin_profile_delta i shall be in the range of 0 to 1 when reshaper_model_num_cw_minus1 is equal to 0. The value of reshaper_model_bin_profile_delta i shall be in the range of 0 to 2 when reshaper_model_num_cw_minus1 is equal to 1.
  CW=32 when reshaper_model_bin_profile_delta i is set equal to 0, CW=reshaper_model_CW[0] when reshaper_model_bin_profile_delta i is set equal to 1;
  CW=reshaper_model_CW[1] when reshaper_model_bin_profile_delta i is set equal to 2. In an embodiment, reshaper_model_num_cw_minus1 is allowed to be larger than 1 allowing reshaper_model_num_cw_minus1 and reshaper_model_bin_profile_delta[i] to be signaled with ue(v) for more efficient coding.

In another embodiment, as described in Table 4, the number of codewords per bin may be defined explicitly.

TABLE 4

Syntax of reshaping using a third model

| | Descriptor |
|---|---|
| slice_reshaper_model ( ) { | |
|   reshaper_model_number_bins_minus1 | ue(v) |
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   for ( i = reshaper_model_min_bin_idx; i <= reshaper_model_max_bin_idx; i++) { | |
|     reshaper_model_bin_delta_abs_CW [ i ] | u(v) |
|     if( reshaper_model_bin_delta_abs_CW[ i ] ) > 0 ) | |
|       reshaper_model_bin_delta_sign_CW_flag[ i ] | u(1) |
|   } | |
| } | | reshaper_model_number_bins_minus1 plus 1 specifies the number of bins used for the luma component. In some embodiments it may be more efficient that the number of bins is a power of two. Then, the total number of bins may be represented by its log 2 representation, e.g., using an alternative parameter like log 2_reshaper_model_number_bins_minus1. For example, for 32 bins log 2_reshaper_model_number_bins_minus1=4.
  reshaper_model_bin_delta_abs_cw_prec_minus1 plus 1 specifies the number of bits used for the representation of the syntax reshaper_model_bin_delta_abs_CW[i].
  reshaper_model_bin_delta_abs_CW[i] specifies the absolute delta codeword value for the i-th bin.
  reshaper_model_bin_delta_sign_CW_flag[i] specifies the sign of reshaper_model_bin_deltaabs_CW[i] as follows:
    If reshaper_model_bin_delta_sign_CW_flag[i] is equal to 0, the corresponding variable RspDeltaCW[i] has a positive value.
    Otherwise (reshaper_model_bin_delta_sign_CW_flag[i] is not equal to 0), the corresponding variable RspDeltaCW[i] has a negative value.
  When reshaper_model_bin_delta_sign_CW_flag[i] is not present, it is inferred to be equal to 0.

The variable RspDeltaCW[$i$]=(1−2*reshaper_model_bin_delta_sign_CW[$i$])*reshaper_model_bin_delta_abs_CW[$i$];

The variable OrgCW is set equal to (1<<$BitDepth_Y$)/(reshaper_model_number_bins_minus1+1);
The variable RspCW[i] is derived as follows:
  if reshaper_model_min_bin_idx<=i<=reshaper_model_max_bin_idx
  then RspCW[i]=OrgCW+RspDeltaCW[i].
  else, RspCW[i]=0.
In an embodiment, assuming the codeword allocation according to one of the earlier examples, e.g., equation (4), an example of how to define the parameters in Table 2, comprises:

First assume one assigns "bin importance" as follows: (9)

For the $k$-$th$ bin, if $M_k = 0$;

bin_importance= 0;

else if $M_k == M_f$

```
bin_importance = 2;
else
    bin_importance = 1;
end
```

As used herein, the term "bin importance" is a value assigned to each of the N codeword bins to indicate the importance of all codewords in that bin in the reshaping process with respect to other bins.

In an embodiment, one may set the default_bin_importance from reshaper_model_min_bin_idx to reshaper_model_max_bin_idx to 1. The value of reshaper_model_min_bin_idx is set to the smallest bin index which has $M_k$ not equal to 0. The value of reshaper_model_max_bin_idx is set to the largest bin index which has $M_k$ not equal to 0. reshaper_model_bin_profile_delta for each bin within [reshaper_model_min_bin_idx reshaper_model_max_bin_idx] is the difference between bin_importance and the default_bin_importance.

An example of how to use the proposed parametric model to construct a Forward Reshaping LUT (FLUT) and an Inverse Reshaping LUT (ILUT) is shown as follows.

1) Divide the luminance range into N bins (e.g., N=32)
2) Derive the bin-importance index for each bin from the syntax. E.g.:

```
For the k-th bin,
    if reshaper_model_min_bin_idx <=k<=
    reshaper_model_max_bin_idx
        bin_importance[k] = default_bin_importance[k] +
        reshaper_model_bin_profile_delta[k] ;
    else
        bin_importance[k] = 0;
```

3) Automatically pre-assign codewords based on bin importance:

```
for the k-th bin,
    if bin_importance[k] == 0
        M_k = 0;
    else if bin_importance[k] == 2
        M_k = M_f;
    else
        M_k = M_a ;
end
```

4) Build forward reshaping LUT based on codeword assignment for each bin, by accumulating the codeword assigned for each bin. The sum up should be less or equal to total codeword budget (e.g. 1024 for 10-bit full range). (E.g., see earliest C code).
5) Build inverse reshaping LUT (e.g., see earliest C code).

From a syntax point of view, alternative methods can also be applied. The key is to specify the number of codewords in each bin (e.g., $M_k$, for k=0, 1, 2, . . . , N−1) either explicitly or implicitly. In one embodiment, one can specify explicitly the number of codewords in each bin. In another embodiment, one can specify the codewords differentially. For example, the number of codewords in a bin can be determined using the difference of the number of codewords in the current bin and the previous bin (e.g., M_Delta(k)=M(k)−M(k−1)). In another embodiment, one can specify the most commonly used number of codewords (say, $M_M$) and express the number of codewords in each bin as the difference of the codeword number in each bin from this number (e.g., M_Delta(k)=M(k)−$M_M$).

In an embodiment, two reshaping methods are supported. One is denoted as the "default reshaper," where $M_f$ is assigned to all bins. The second, denoted as "adaptive reshaper," applies the adaptive reshaper described earlier. The two methods can be signaled to a decoder as in Ref. [6] using a special flag, e.g., sps_reshaper_adaptive_flag (e.g., use sps_reshaper_adaptive_flag=0 for the default reshaper and use sps_reshaper_adaptive_flag=1 for the adaptive reshaper.

Figure 2A:
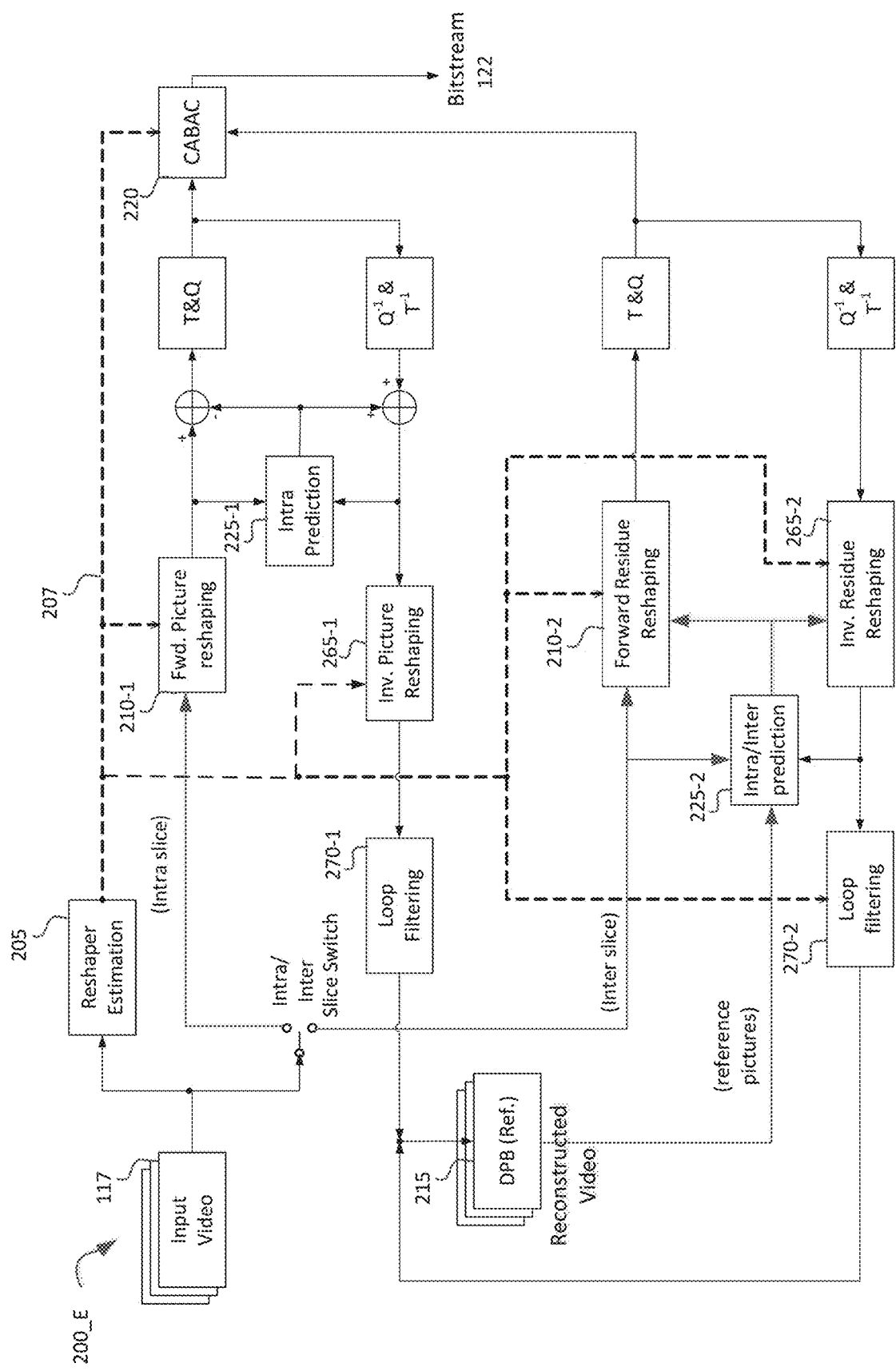
FIG. 2A depicts an example architecture for an encoder using hybrid in-loop reshaping according to an embodiment of this invention.
Figure 2B:
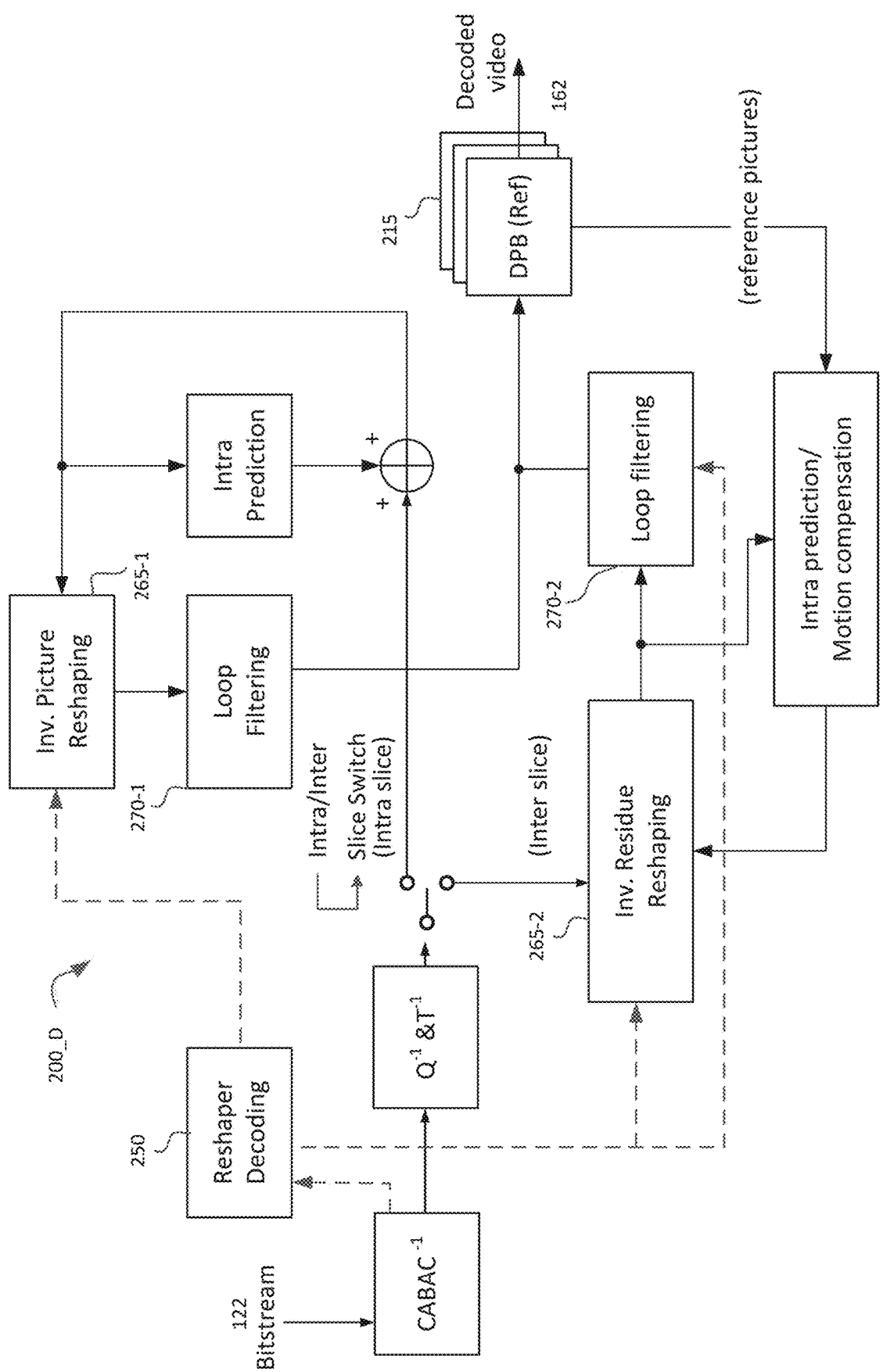
FIG. 2B depicts an example architecture for a decoder using hybrid in-loop reshaping according to an embodiment of this invention.

The invention is applicable to any reshaping architecture proposed in Ref. [6], such as: an external reshaper, in-loop intra only reshaper, in-loop residue reshaper, or in-loop hybrid reshaper. As an example, FIGS. 2A and 2B depict example architectures for hybrid in-loop reshaping according to embodiments of this invention. In FIG. 2A, the architecture combines elements from both an in-loop intra only reshaping architecture (top of the Figure) and an in-loop residual architecture (bottom part of the Figure). Under this architecture, for intra slices, reshaping is applied to the picture pixels, while for inter slices, reshaping is applied to the prediction residuals. In the encoder (200_E), two new blocks are added to a traditional block-based encoder (e.g., HEVC): a block (205) to estimate the forward reshaping function (e.g., according to FIG. 4), the forward picture reshaping block (210-1), and the forward residue reshaping block (210-2), which applies the forward reshaping to one or more of the color components of the input video (117) or prediction residuals. In some embodiments, these two operations may be performed as part of a single image reshaping block. Parameters (207) related to determining the inverse reshaping function in the decoder may be passed to the lossless encoder block of the video encoder (e.g., CABAC 220) so that they can be embedded into the coded bitstream (122). In intra-mode, intra prediction (225-1), transform and quantization (T&Q), and inverse transform and inverse quantization ($Q^{-1}$ & $T^{-1}$) all use reshaped pictures. In both modes, stored pictures in the DPB (215) are always in inverse-reshaped mode, which requires an inverse picture reshaping block (e.g. 265-1) or an inverse residual reshaping block (e.g. 265-2) before the loop filter (270-1, 270-2). As depicted in FIG. 2A, an Intra/Inter Slice switch allows switching between the two architectures depending on the slice type to be encoded. In another embodiment, in-loop filtering for Intra slices may be performed before inverse reshaping.

In the decoder (200_D), the following new normative blocks are added to a traditional block-based decoder: a block (250) (reshaper decoding) to reconstruct a forward reshaping function and an inverse reshaping function based on the encoded reshaping function parameters (207), a block (265-1) to apply the inverse reshaping function to the decoded data, and a block (265-2) to apply both the forward reshaping function and inverse reshaping function to generate the decoded video signal (162). For example, in (265-2) the reconstructed value is given by Rec=ILUT (FLUT(Pred)+Res), where FLUT denotes the forward reshaping LUT and ILUT denotes the inverse reshaping LUT.

In some embodiments, operations related to blocks 250 and 265 may be combined into a single processing block. As depicted in FIG. 2B, an Intra/Inter Slice switch allows switching between the two modes depending on the slice types in the encoded video pictures.

Figure 3A:
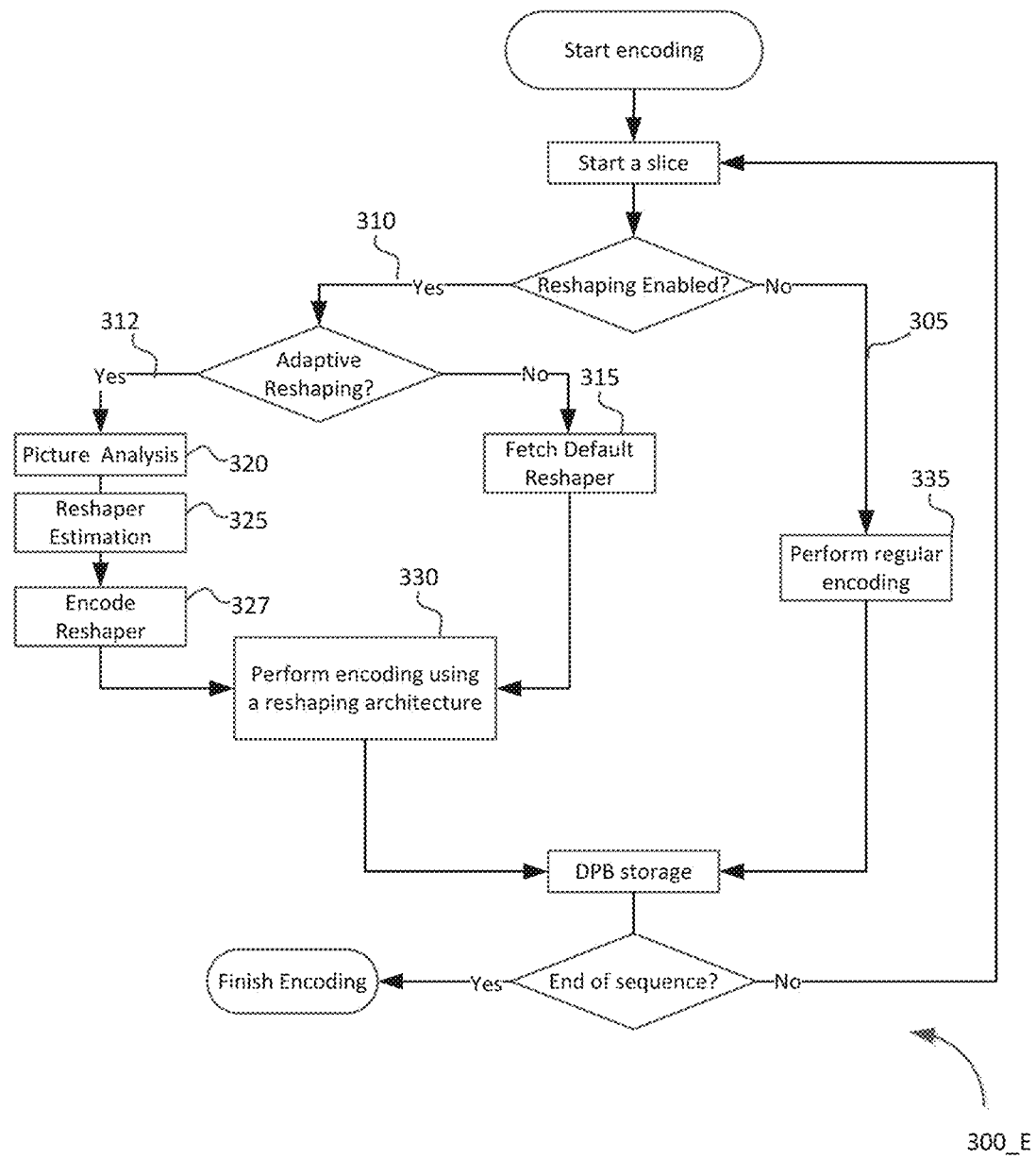
FIG. 3A depicts an example process for encoding video using a reshaping architecture according to an embodiment of this invention.

FIG. 3A depicts an example process (300_E) for encoding video using a reshaping architecture (e.g., 200_E) according to an embodiment of this invention. If there is no reshaping enabled (path 305), then encoding (335) proceeds as known in prior-art encoders (e.g., HEVC). If reshaping is enabled (path 310), then an encoder may have the options to either apply a pre-determined (default) reshaping function (315), or adaptively determine a new reshaping function (325) based on a picture analysis (320) (e.g., as described in FIG. 4). Following encoding a picture using a reshaping architecture (330), the rest of the encoding follows the same steps as the traditional coding pipeline (335). If adaptive reshaping (312) is employed, metadata related to the reshaping function are generated as part of the "Encode Reshaper" step (327).

Figure 3B:
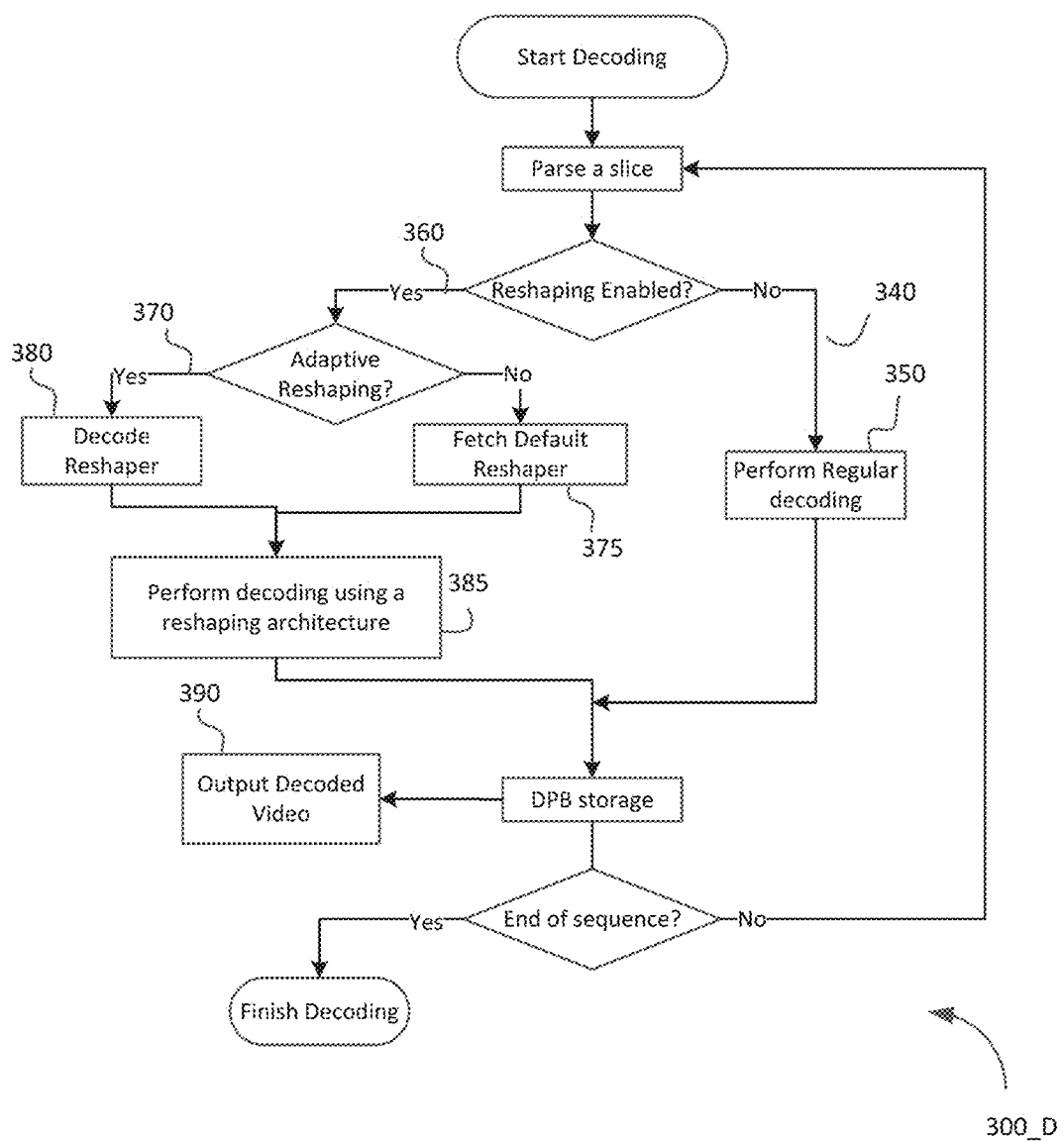
FIG. 3B depicts an example process for decoding video using a reshaping architecture according to an embodiment of this invention.

FIG. 3B depicts an example process (300_D) for decoding video using a reshaping architecture (e.g., 200_D) according to an embodiment of this invention. If there is no reshaping enabled (path 340), then after decoding a picture (350), output frames are generated (390) as in a traditional decoding pipeline. If reshaping is enabled (path 360), then, the decoder determines whether to apply a pre-determined (default) reshaping function (375), or adaptively determine the reshaping function (380) based on received parameters (e.g., 207). Following decoding using a reshaping architecture (385), the rest of the decoding follows the traditional decoding pipeline.

As described in Ref. [6] and earlier in this specification, the forward reshaping LUT FwdLUT may be built by integration, while the inverse reshaping LUT may be built based on a backward mapping using the forward reshaping LUT (FwdLUT). In an embodiment, the forward LUT may be built using piecewise linear interpolation. At the decoder, inverse reshaping can be done by using the backward LUT directly or again by linear interpolation. The piece-wise linear LUT is built based on input pivot points and output pivot points.

Let (X1, Y1), (X2, Y2) be two input pivot points and their corresponding output values for each bin. Any input value X between X1 and X2 can be interpolated by the following equation:

$Y=((Y2-Y1)/(X2-X1))*(X-X1)+Y1.$

In a fixed-point implementation, the above equation can be rewritten as $Y=((m*X+2^{FP\_PREC-1})>>FP\_PREC)+c$ where m and c denote the scalar and offset for linear interpolation and FP_PREC is a constant related to the fixed-point precision.

As an example, FwdLUT may be built as follows: Let the variable lutSize=(1<<BitDepth$_Y$).

Let variables binNum=reshaper_model_number_bins_minus1+1, and binLen=lutSize/binNum.

For the i-th bin, its two bracketing pivots (e.g., X1 and X2) may be derived as X1=i*binLen and X2=(i+1)*binLen. Then:

```
binsLUT[ 0 ] = 0;
for( i = 0; i < reshaper_model_number_bins_minus1 + 1; i++) {
  binsLUT[ (i + 1) * binLen] = binsLUT[i*binLen] + RspCW[ i ];
  Y1 = binsLUT[i*binLen];
  Y2 = binsLUT[(i + 1)*binLen];
  scale = ((Y2 - Y1) * (1 << FP_PREC) + (1 << (log2(binLen)- 1))) >> log2(binLen));
  for (j = 1; j < binLen; j++) {
    binsLUT[i*binLen + j] = Y1 + ((scale * j + (1 << (FP_PREC - 1))) >> FP_PREC);
  }
}
```

FP_PREC defines the fixed-point precision of the fractional part of the variables (e.g., FP_PREC=14). In an embodiment, binsLUT[ ] may be computed in higher precision than the precision of FwdLUT. For example, binsLUT[ ] values may be computed as 32-bit integers, but FwdLUT may be the binsLUT values clipped at 16 bits.

Adaptive Threshold Derivation

Figure 5:
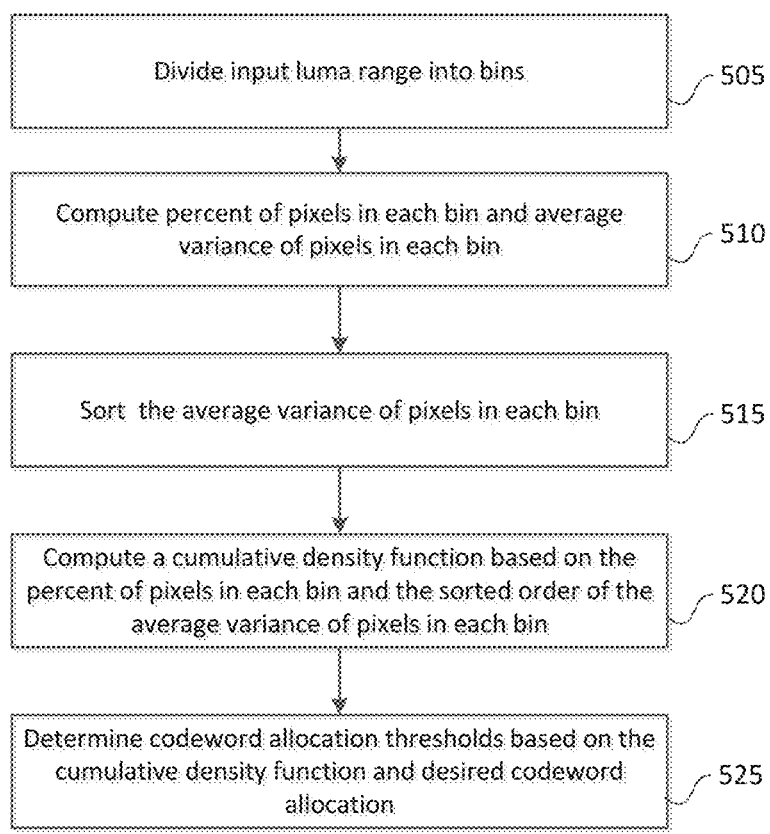
FIG. 5 depicts an example process for deriving reshaping thresholds according to an embodiment of this invention.

As described earlier, during reshaping, the codeword allocation may be adjusted using one or more thresholds (e.g., TH, TH$_U$, TH$_L$, and the like). In an embodiment, such thresholds may be generated adaptively based on the content characteristics. FIG. 5 depicts an example process for deriving such thresholds according to an embodiment.

1) In step 505, the luminance range of an input image is divided into N bins (e.g., N=32). For example, let N also be denoted as PIC_ANALYZE_CW_BINS.
2) In step 510, one performs an image analysis to calculate luminance characteristics for each bin. For example, one may compute the percentage of pixels in each bin (to be denoted as BinHist[b], b=1, 2, ..., N), where BinHist[$b$]=100*(total pixels in bin $b$)/(total pixels in the picture), (10)

As discussed before, another good metric of image characteristics is the average variance (or standard deviation) of pixels in each bin, to be denoted BinVar[b]. BinVar[b] may be computed in "block mode" as var$_{bin}$(k) in the steps described in the section leading to equations (2) and (3). Alternatively, the block-based calculation could be refined with pixel-based calculations. For example, denote as vf(i) the variance associated with a group of pixels surrounding the i-th pixel in a m×m neighborhood window (e.g., m=5) with the i-th pixel at its center). For example, if $$\mu(i) = \frac{1}{W_N} \sum_{k=1}^{W_N} x(k), \quad (11)$$

denotes the mean value of pixels in a W$_N$=m*m window (e.g., m=5) surrounding the i-th pixel with value x(i), then $$vf(i) = \frac{1}{W_N} \sum_{k=1}^{W_N} (x(k) - \mu(i))^2. \quad (12)$$

An optional non-linear mapping, such as vf(i)=log 10(vf(i)+1), can be used to suppress the dynamic range of raw variance values. Then, the variance factor may be used in calculating the average variance in each bin as $$BinVar[b] = \frac{1}{K_b}\sum_{i=1}^{K_b} vf[i], \quad (13)$$

where $K_b$ denotes the number of pixels in bin b.

3) In step 515, the average bin variances (and their corresponding indices) are sorted, for example and without limitation in descending order. For example, sorted BinVar values may be stored in BinVarSortDsd [b] and sorted bin indices may be stored in BinIdxSortDsd[b]. As an example, using C code, the process may be described as:

```
for (int b = 0; b < PIC_ANALYZE_CW_BINS; b++)
// initialize (unsorted)
{
    BinVarSortDsd[b] = BinVar[b];
    BinIdxSortDsd[b] = b;
}
//sort (see example code in Appendix 1)
bubbleSortDsd(BinVarSortDsd, BinIdxSortDsd,
PIC_ANALYZE_CW_BINS) ;
```

Figure 6A:
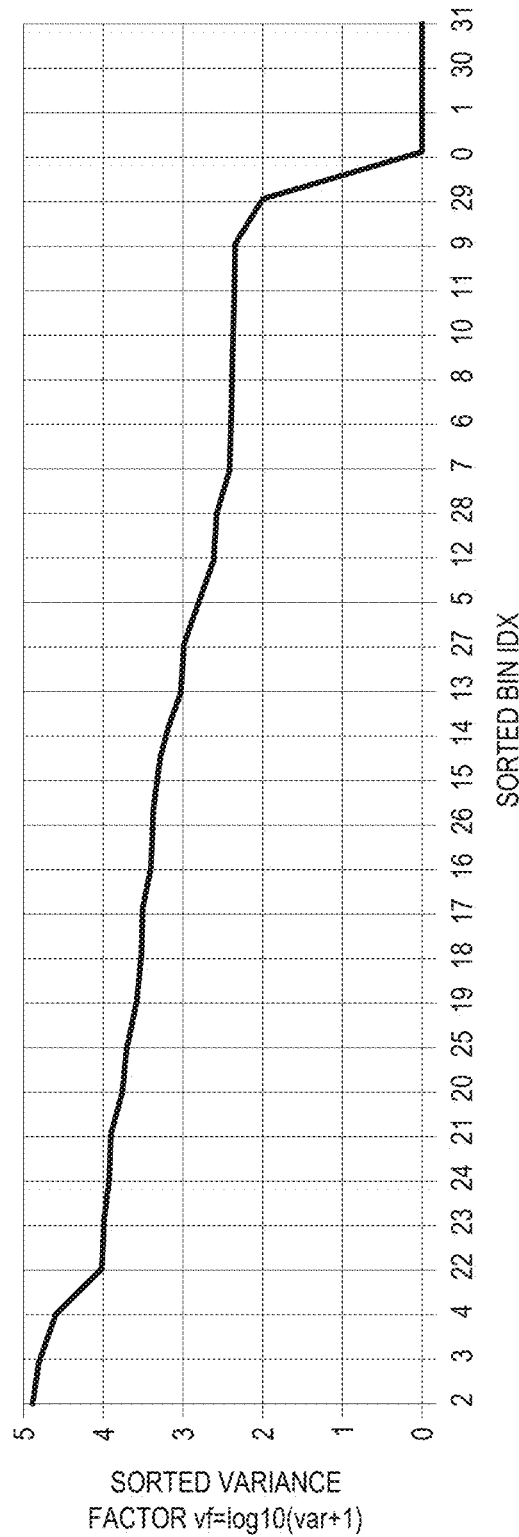

An example plot of sorted average bin variance factors is depicted in FIG. 6A.

4) Given the bin histogram values computed in step 510, in step 520, one computes and stores a cumulative density function (CDF) according to the order of sorted average bin variances. For example, if the CDF is stored in array BinVarSortDsdCDF[b], in an embodiment:

```
BinVarSortDsdCDF[0] = BinHist[BinIdxSortDsd[0]];
for (int b = 1; b < PIC_ANALYZE_CW_BINS; b++)
{
    BinVarSortDsdCDF[b] = BinVarSortDsdCDF[b - 1] +
BinHist[BinIdxSortDsd[b]];
}
```

Figure 6B:
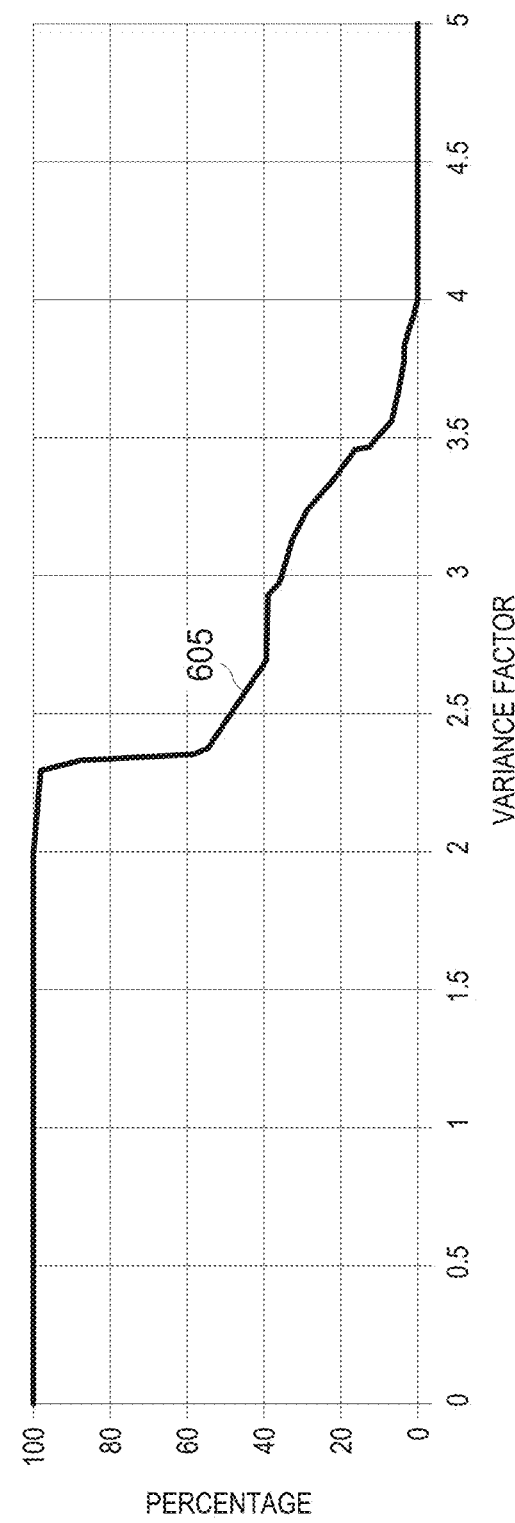

An example plot (605) of a computed CDF, based on the data of FIG. 6A, is depicted in FIG. 6B. The pairs of CDF values versus sorted average bin variances: {x=BinVarSortDsd[b], y=BinVarSortDsdCDF[b]}, can be interpreted as: "there are y % pixels in the picture having variance greater than or equal to x" or "there are (100−y) % pixels in the picture having variance less than x."

5) Finally, in step 525, given the CDF BinVarSortDsdCDF[BinVarSortDsd[b]] as a function of the sorted average bin-variance values, one can define thresholds based on bin variances and the accumulated percentages.

Examples for determining a single threshold or two thresholds are shown in FIGS. 6C and 6D respectively. When only one threshold is being used (e.g., TH), as an example, TH may be defined as "the average variance where k % of the pixels have vf≥TH." Then TH can be calculated by finding the intersection of the CDF plot (605) at k % (e.g., 610) (e.g., the BinVarSortDsd[b] value where BinVarSortDsdCDF=k %); For example, as depicted in FIG. 6C, for k=50, TH=2.5. Then, one can assign $M_f$ codewords for bins having BinVar[b]<TH and $M_a$ codewords for bins having BinVar[b]≥TH. As a rule of thumb, it is preferable to assign a larger number of codewords to bins with smaller variance (e.g., $M_f$>32>$M_a$, for 10-bit video signal with 32 bins).

When using two thresholds, an example of selecting $TH_L$ and $TH_U$ is depicted in FIG. 6D. For example, without loss of generality, $TH_L$ may be defined as the variance where 80% pixels have vf $TH_L$ (then, in our example, $TH_L$=2.3), and $TH_U$ may be defined as the variance where 10% of all pixels have vf $TH_U$ (then, in our example, $TH_U$=3.5). Given these thresholds, one can assign $M_f$ codewords for bins having BinVar[b]<$TH_L$ and $M_a$ codewords for bins having BinVar[b] $TH_U$. For bins having BinVar in between $TH_L$ and $TH_U$, one may use the original numbers of codewords per bin (e.g., 32 for B=10).

The techniques above can be easily extended to cases with more than two thresholds. The relationship can also be used to adjust the number of codewords ($M_f$, $M_a$, etc.). As a rule of thumb, in low-variance bins, one should assign more codewords to boost PSNR (and reduce MSE); for high-variance bins, one should assign less codewords to save bits.

In an embodiment, if the set of parameters (e.g., $TH_L$, $TH_U$, $M_a$, $M_f$, and the like) were obtained manually for specific content, for example, through an exhaustive manual parameter tuning, this automatic method may be applied to design a decision tree to categorize each content in order to set the optimum manual parameters automatically. For example, content categories include: film, television, SDR, HDR, cartoons, nature, action, and the like.

To reduce complexity, in-loop reshaping may be constrained using a variety of schemes. If in-loop reshaping is adopted in a video coding standard, then these constrains should be normative to guarantee decoder simplifications. For example, in an embodiment, luma reshaping may be disabled for certain block coding sizes. For example, one could disable intra and inter reshaper mode in an inter slice when nTbW*nTbH<TH, where the variable nTbW specifies the transform block width and variable nTbH specifies the transform block height. For example, for TH=64, blocks with sizes 4×4, 4×8, and 8×4 are disabled for both intra and inter mode reshaping in inter-coded slices (or tiles).

Similarly, in another embodiment, one may disable luma-based, chroma residue scaling in intra mode in inter-coded slices (or tiles), or when having separate luma and chroma partitioning trees is enabled.

Interaction with Other Coding Tools

Loop Filtering

In Ref. [6], it was described that a loop filter can operate either in the original pixel domain or in the reshaped pixel domain. In one embodiment it is suggested that loop filtering is performed in the original pixel domain (after picture reshaping). For example, in a hybrid in-loop reshaping architecture (200_E and 200_D), for intra picture, one will need to apply inverse reshaping (265-1) before the loop filter (270-1).

Figure 2C:
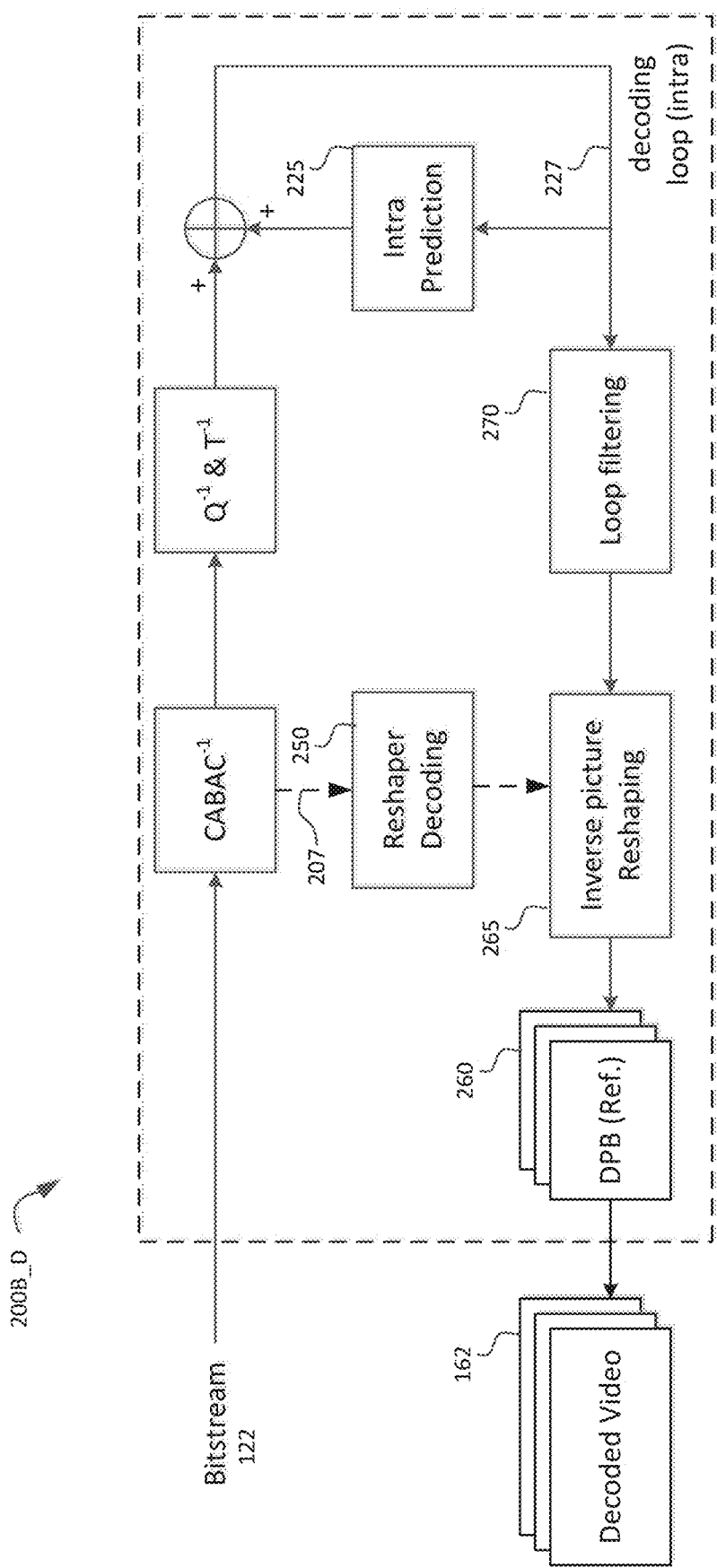
FIG. 2C depicts an example architecture for intra-CU decoding using reshaping according to an embodiment.
Figure 2D:
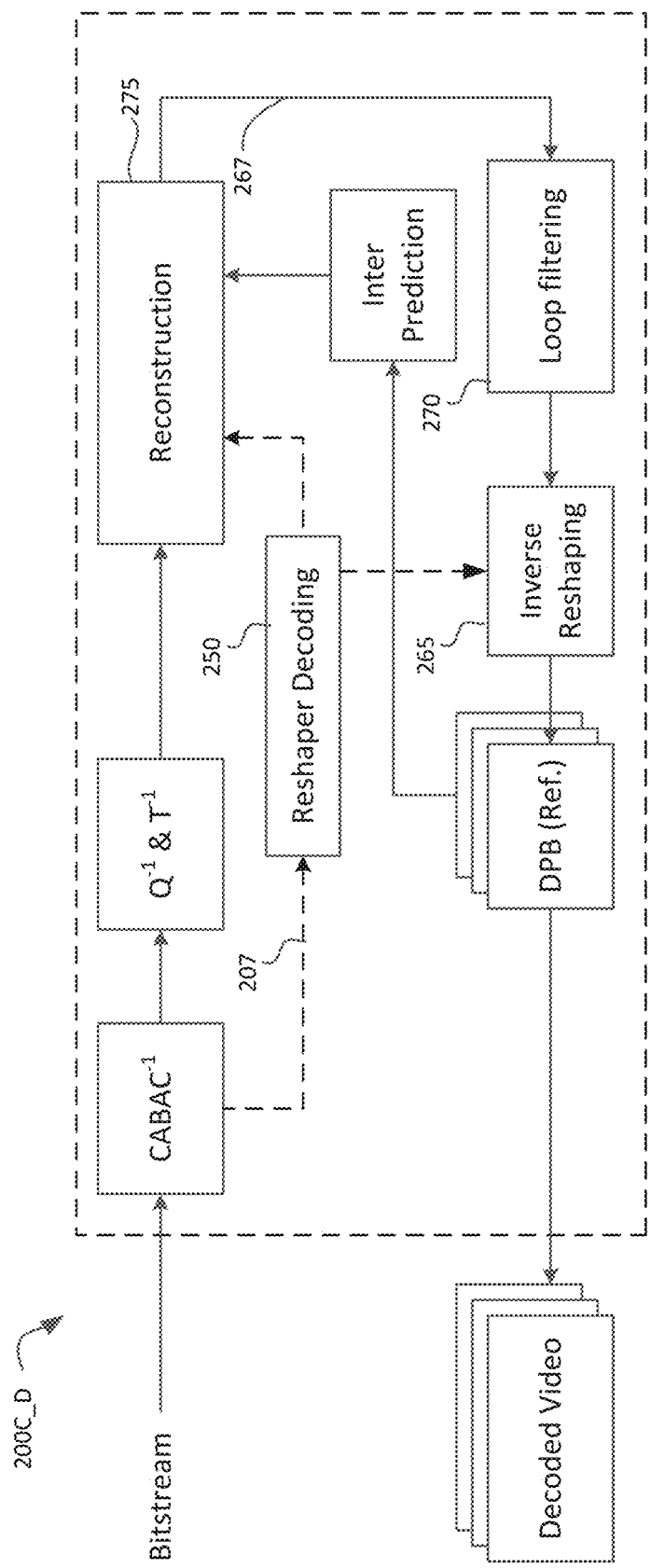
FIG. 2D depicts an example architecture for inter-CU decoding using reshaping according to an embodiment.

FIG. 2C and FIG. 2D depict alternative decoder architectures (200B_D and 200C_D) where inverse reshaping (265) is performed after the loop filtering (270), just before storing the decoded data into the decoded picture buffer (DPB) (260). In the proposed embodiments, compared to the architecture in 200_D, the inverse residue reshaping formula for inter slices is modified, and inverse reshaping (e.g., via an InvLUT( ) function or look-up-table) is performed after loop filtering (270). In this way, inverse reshaping is performed for both intra slices and inter slices after loop filtering, and the reconstructed pixels before loop filtering for both intra-coded CU and inter-coded CU are in the reshaped domain. After inverse reshaping (265), the output samples which are stored in the Reference DPB are all in the original domain Such an architecture allows for both slice-based adaption and CTU-based adaption for in-loop reshaping.

As depicted in FIG. 2C and FIG. 2D, in an embodiment, loop filtering (270) is performed in the reshaped domain for both intra-coded and inter-coded CUs, and inverse picture reshaping (265) happens only once, thus presenting a unified, and simpler architecture for both intra and inter-coded CUs.

For decoding intra-coded CUs (200B_D), Intra prediction (225) is performed on reshaped neighboring pixels. Given residual Res, and a predicted sample PredSample, the reconstructed sample (227) is derived as:

$$RecSample = Res + PredSample. \quad (14)$$

Given the reconstructed samples (227), loop filtering (270) and inverse picture reshaping (265) are applied to derive RecSampleInDPB samples to be stored in DPB (260), where $$RecSampleInDPB = InvLUT(LPF(RecSample))) == \quad (15)$$
$$InvLUT(LPF(Res + PredSample))),$$

where InvLUT( ) denotes the inverse reshaping function or inverse reshaping look-up table, and LPF( ) denotes the loop-filtering operations.

In traditional coding, inter/intra-mode decisions are based on computing a distortion function (dfunc( )) between the original samples and the predicted samples. Examples of such functions include the sum of square errors (SSE), the sum of absolute differences (SAD), and others. When using reshaping, at the encoder side (not shown), CU prediction and mode decision are performed on the reshaped domain. That is, for mode decision, $$distortion = dfunc(FwdLUT(SrcSample) - RecSample), \quad (16)$$

where FwdLUT( ) denotes the forward reshaping function (or LUT) and SrcSample denotes the original image samples.

For inter-coded CUs, at the decoder side (e.g., 200C_D), inter prediction is performed using reference pictures in the non-reshaped domain in the DPB. Then in reconstruction block 275, the reconstructed pixels (267) are derived as:

$$RecSample = (Res + FwdLUT(PredSample)). \quad (17)$$

Given the reconstructed samples (267), loop filtering (270) and inverse picture reshaping (265) are applied to derive RecSampleInDPB samples to be stored in DPB, where $$RecSampleInDPB = InvLUT(LPF(RecSample))) = InvLUT(LPF(Res + FwdLUT(PredSample)))). \quad (18)$$

At the encoder side (not shown), intra prediction is performed in the reshaped domain as $$Res = FwdLUT(SrcSample) - PredSample, \quad (19a)$$

under the assumption that all neighbor samples (PredSample) used for prediction are already in the reshaped domain Inter prediction (e.g., using motion compensation) is performed in the non-reshaped domain (i.e., using reference pictures from the DPB directly), i.e., $$PredSample = MC(RecSampleinDPB), \quad (19b)$$

where MC( ) denotes the motion compensation function. For motion estimation and fast mode decision, where residue is not generated, one can compute distortion using distortion=dfunc(SrcSample-PredSample).

However, for full mode decision where residue is generated, mode decision is performed in the reshaped domain. That is, for full mode decision, $$distortion = dfunc(FwdLUT(SrcSample) - RecSample). \quad (20)$$

Block Level Adaptation

As explained before, the proposed in-loop reshaper allows reshaping to be adapted at the CU level, e.g., to set the variable CU_reshaper on or off as needed. Under the same architecture, for an inter-coded CU, when CU_reshaper=off, the reconstructed pixels need to be in the reshaped domain, even if the CU_reshaper flag is set to off for this inter-coded CU.

$$RecSample = FwdLUT(Res + PredSample), \quad (21)$$

so that intra-prediction always has neighboring pixels in the reshaped domain. The DPB pixels can be derived as:

$$RecSampleInDPB = InvLUT(LPF(RecSample))) = \quad (22)$$
$$= InvLUT(LPF(FwdLUT(Res + PredSample))).$$

For an intra-coded CU, depending on the encoding process, two alternative methods are proposed:
1) All intra-coded CUs are coded with CU_reshaper=on. In this case, no additional processing is needed because all pixels are already in the reshaped domain.
2) Some intra-coded CUs can be coded using CU_reshaper=off. In this case, for CU_reshaper=off, when applying intra prediction, one needs to apply inverse reshaping to the neighboring pixels so that intra prediction is performed in the original domain and the final reconstructed pixels need to be in the reshaped domain, i.e., $$RecSample = FwdLUT(Res + InvLUT(PredSample)), \quad (23)$$

then $$RecSampleInDPB = InvLUT(LPF(RecSample))) = \quad (24)$$
$$= InvLUT(LPF(FwdLUT(Res + InvLUT(PredSample))))).$$

Figure 2E:
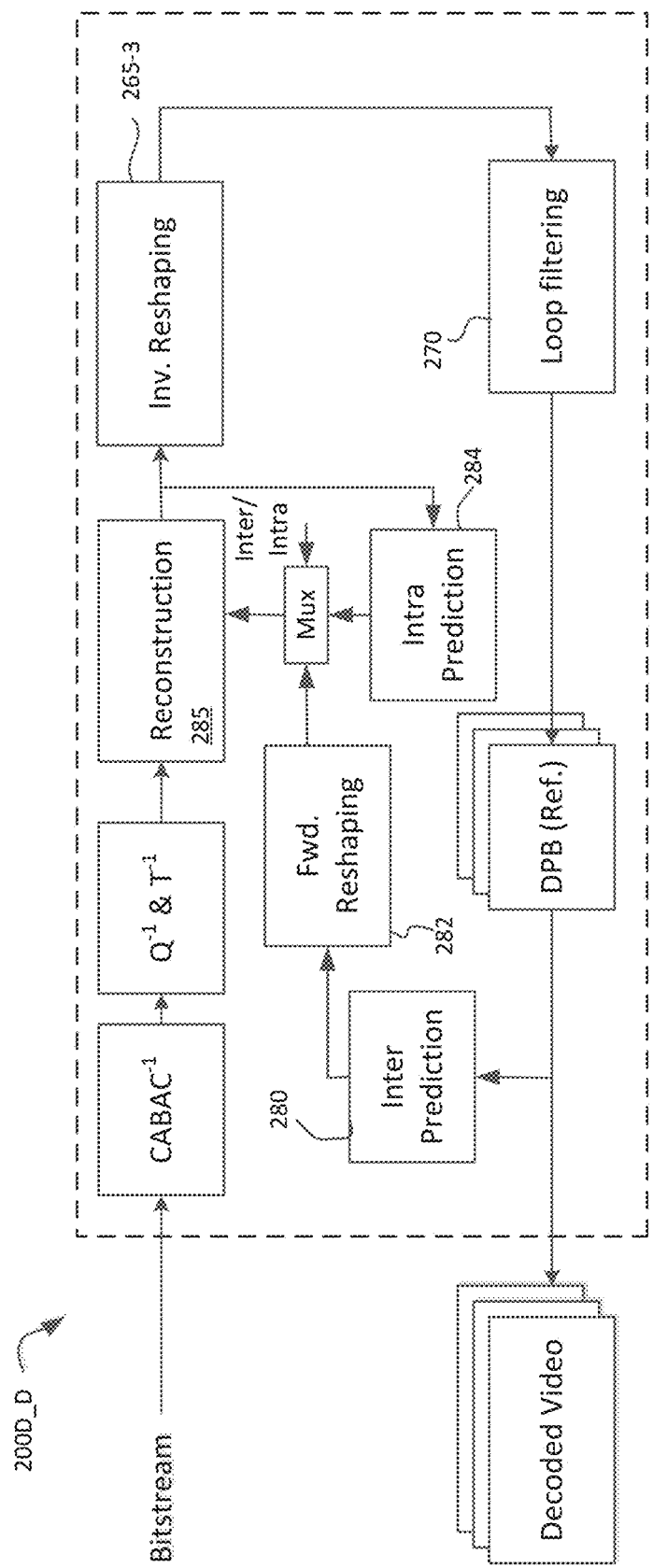
FIG. 2E depicts an example architecture for intra-CU decoding within inter-coded slices according to an embodiment for luma or chroma processing.

In general, the proposed architectures may be used in a variety of combinations, such as in-loop intra-only reshaping, in-loop reshaping only for prediction residuals, or a hybrid architecture which combines both intra, in-loop, reshaping and inter, residual reshaping. For example, to reduce the latency in the hardware decoding pipeline, for inter slice decoding, one can perform intra prediction (that is, decode intra CUs in an inter slice) before inverse reshaping. An example architecture (200D_D) of such an embodiment is depicted in FIG. 2E. In the reconstruction module (285), for Inter CUs (e.g., the Mux enables the output from 280 and 282), from equation (17), $$RecSample = (Res + FwdLUT(PredSample)).$$

where FwdLUT(PredSample) denotes the output of the inter predictor (280) followed by forward reshaping (282). Otherwise, for Intra CUs (e.g., the Mux enables the output from 284), the output of the reconstruction module (285) is $$RecSample = (Res + IPredSample),$$

where IPredSample denotes the output of the Intra Prediction block (284). The inverse Reshaping block (265-3), generates $$Y_{CU} = InvLUT[RecSample].$$

Applying intra prediction for inter slices in the reshaped domain is applicable to other embodiments as well, including those depicted in FIG. 2C (where inverse reshaping is performed after loop filtering) and FIG. 2D. In all such embodiments, special care needs to be taken in the combined inter/intra prediction mode (that is, when during reconstruction, some samples are from inter-coded blocks and some are from intra-coded blocks), since inter-prediction is in the original domain, but intra-prediction is in the reshaped domain. When combining data from both inter- and intra-predicted coded units, the prediction may be performed in either of the two domains. For example, when the combined inter/intra prediction mode is done in the reshaped domain, then PredSampleCombined=PredSampeIntra+FwdLUT (PredSampleInter)

RecSample=Res+PredSampleCombined, that is, inter-coded samples in the original domain are reshaped before the addition. Otherwise, when the combined inter/intra prediction mode is done in the original domain, then:

PredSampleCombined=InvLUT(PredSampeIntra)+ PredSampleInter

RecSample=Res+FwdLUT(PredSampleCombined), that is, intra-predicted samples are inversed-reshaped to be in the original domain.

Similar considerations are applicable to the corresponding encoding embodiments as well, since encoders (e.g., 200_E) include a decoder loop that matches the corresponding decoder. As discussed earlier, equation (20) describes an embodiment where mode decision is performed in the reshaped domain. In another embodiment, mode decision may be performed in the original domain, that is:

distortion=dfunc(SrcSample−InvLUT(RecSample)).

For luma-based chroma QP offset or chroma residue scaling, the average CU luma value ($\overline{Y_{CU}}$) can always be calculated using the predicted value (instead of the reconstructed value) for minimum latency.

Chroma QP Derivations

As in Ref. [6], one may apply the same proposed chromaDQP derivation process to balance the luma and chroma relationship caused by the reshaping curve. In a embodiment, one can derive a piece-wise chromaDQP value based on the codeword assignment for each bin. For example: for the k-th bin, $scale_k=(M_k/M_a)$;

$chromaDQP=6*\log 2(scale_k)$; (25)

end

Encoder Optimization

As described in Ref. [6], it is recommended to use pixel-based weighted distortion when lumaDQP is enabled. When reshaping is used, in an example, the weight needed is adjusted based on the reshaping function (f(x)). For example:

$W_{rsp}=f'(x)^2$, (26)

where f'(x) denotes the slope of reshaping function f(x).

In another embodiment, one can derive piecewise weights directly based on codeword assignment for each bin. For example:
for the k-th bin, $$W_{rsp}(k) = \left(\frac{M_k}{M_a}\right)^2. \quad (27)$$

For a chroma component, weight can be set to 1 or some scaling factor sf. To reduce chroma distortion, sf can be set larger than 1. To increase chroma distortion, sf can be set larger than 1. In one embodiment, sf can be used to compensate for equation (25). Since chromaDQP can be only set to integer, we can use sf to accommodate the decimal part of chromaDQP: thus, $sf=2^{((chromaDQP-INT(chromaDQP))/3)}$.

In another embodiment, one can explicitly set the chromaQPOffset value in the Picture Parameter Set (PPS) or a slice header to control chroma distortion.

The reshaper curve or mapping function does not need to be fixed for the whole video sequence. For example, it can be adapted based on the quantization parameter (QP) or the target bit rate. In one embodiment, one can use a more aggressive reshaper curve when the bit rate is low and use less aggressive reshaping when the bit rate is relatively high. For example, given 32 bins in 10-bit sequences, each bin has initially 32 codewords. When the bit rate is relative low, one can use codewords between [28 40] to choose codewords for each bin. When the bit rate is high, one can choose codewords between [31 33] for each bin or one can simply use an identity reshaper curve.

Given a slice (or a tile), reshaping at the slice (tile) level can be performed in a variety of ways that may trade-off coding efficiency with complexity, including: 1) disable reshaping in intra slices only; 2) disable reshaping in specific inter slices, such as inter slices on particular temporal level(s), or in inter slices which are not used for reference pictures, or in inter slices which are considered to be less important reference pictures. Such slice adaption can also be QP/rate dependent, so that different adaption rules can be applied for different QPs or bit rates.

In an encoder, under the proposed algorithm, a variance is computed for each bin (e.g., BinVar(b) in equation (13)). Based on that information, one can allocate codewords based on each bin variance. In one embodiment, BinVar(b) may be inversely linearly mapped to the number of codewords in each bin b. In another embodiment, non-linear mappings such as (BinVar(b))$^2$, sqrt(BinVar(b)), and the like, may be used to inversely map the number of codewords in bin b. In essence, this approach allows an encoder to apply arbitrary codewords to each bin, beyond the simpler mapping used earlier, where the encoder allocated codewords in each bin using the two upper-range values $M_f$ and $M_a$ (e.g., see FIG. 6C), or the three upper-range values, $M_f$, 32, or $M_a$, (e.g., see FIG. 6D).

Figure 6E:
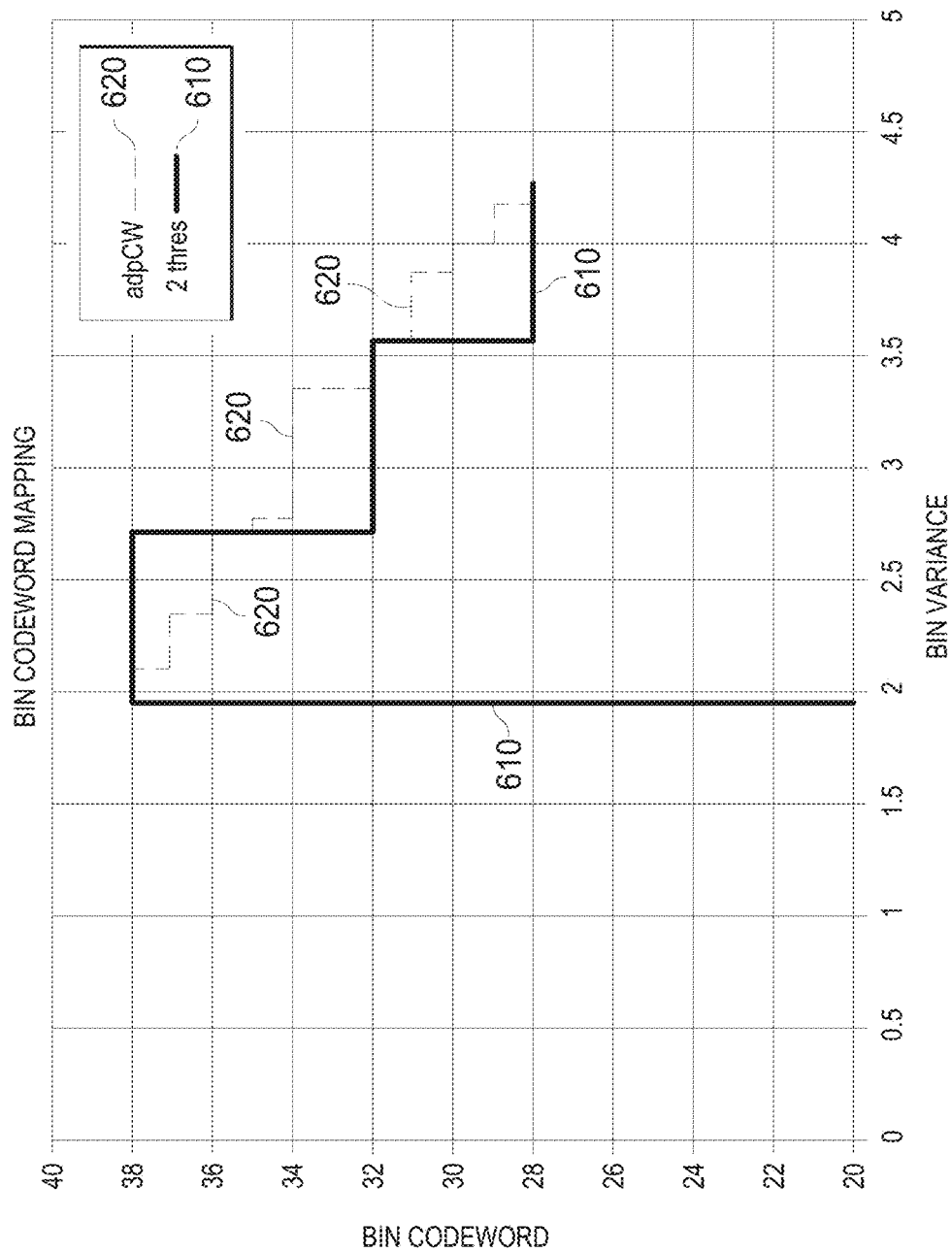
FIG. 6E depicts examples of codeword allocation according to bin variance according to embodiments of this invention.

As an example, FIG. 6E depicts two codeword allocation schemes based on BinVar(b) values, plot 610 depicts the codeword allocation using two thresholds while plot 620 depicts codeword allocation using inverse linear mapping, where the codeword allocation for a bin is inversely proportional to its BinVar(b) value. For example, in an embodiment, the following code may be applied to derive the number of codewords (bin_cw) in a specific bin:

alpha=(minCW−maxCW)/(maxVar−minVar);

beta=(maxCW*maxVar−minCW*minVar)/(maxVar− minVar);

bin_cw=round(alpha*bin_var+beta);

where minVar denotes the minimum variance across all bins, maxVar denotes the maximum variance across all bins, and minCW, maxCW denote the minimum and maximum number of codewords per bin, as determined by the reshaping model.

Luma-Based Chroma QP Offset Refinement

In Ref. [6], to compensate for the interaction between luma and chroma, an additional chroma QP offset (denoted as chromaDQP or cQPO) and a luma-based chroma residual scaler (cScale) were defined. For example:

$$\text{chromaQP} = \text{QP\_luma} + \text{chromaQPOffset} + c\text{QPO}, \quad (28)$$

where chromaQPOffset denotes a chroma QP offset, and QP_luma denotes the luma QP for the coding unit. As presented in Ref. [6], in an embodiment $$c\text{QPO} = -6*\log 2(\text{FwdLUT}'[\overline{Y_{CU}}]) = -d\text{QP}(\overline{Y_{CU}}), \quad (29)$$

where FwdLUT' denotes the slope (first order derivative) of the FwdLUT( ) For an inter slice, $\overline{Y_{CU}}$ denotes the average predicted luma value of the CU. For an intra slice, $\overline{Y_{CU}}$ denotes the inverse reshaped value of the average predicted Luma value of the CU. When dual tree coding is used for a CU (that is, the luma and chroma components have two separate coding trees and therefore luma reconstruction is available before chroma coding starts), the average reconstructed luma value of the CU can be used to derive the cQPO value. The cScale scaling factor was defined as $$c\text{Scale} = \text{FwdLUT}'[\overline{Y_{CU}}] = \text{pow}(2, -c\text{QPO}/6), \quad (30)$$

where $y = \text{pow}(2, x)$ denotes the $y = 2^x$ function.

Given the non-linear relationship between luma-derived QP values (denoted as qPi) and the final chroma QP values (denoted as Qpc) (for example, see Table 8-10, "Specification of Qpc as a function of qPi for ChromaArrayType equal to 1" in Ref [4]), in an embodiment cQPO and cScale may be further adjusted as follows.

Denote as f_QPQQPc( ) a mapping between adjusted luma and chroma QP values, e.g., as in Table 8-10 of Ref. [4], then $$\text{chromaQP\_actual} = f\_QPi2QPc[\text{chromaQP}] = \quad (31)$$
$$= f\_QPi2QPc[QP\_luma + \text{chromaQPOffset} + cQPO].$$

For scaling the chroma residual, the scale need to be calculated based on the real difference between the actual chroma coding QP, both before applying cQPO and after applying cQPO:

QPcBase=f_QPi2QPc[QP_luma+chromaQPOffset];

QPcFinal=f_QPi2QPc[QP_luma+chromaQPOffset+ cQPO];

cQPO_refine=QPcFinal−QPcBase;

$$c\text{Scale} = \text{pow}(2, -c\text{QPO\_refine}/6). \quad (32)$$

In another embodiment, one can absorb chromaQPOffset into cScale too. For example, QPcBase=f_QPi2QPc[QP_luma];

QPcFinal=f_QPi2QPc[QP_luma+chromaQPOffset+ cQPO];

cTotalQPO_refine=QPcFinal−QpcBase;

$$c\text{Scale} = \text{pow}(2, -c\text{TotalQPO\_refine}/6). \quad (33)$$

As an example, as described in Ref. [6], in an embodiment:

Let CSCALE_FP_PREC=16 denote a precision parameter

Forward scaling: after chroma residual is generated, before transformation and quantization:

C_Res=C_orig−C_pred

C_Res_scaled=C_Res*cScale+(1<<(CSCALE_FP_ PREC−1)))>>CSCALE_FP_PREC

Inverse scaling: after chroma inverse quantization and inverse transformation, but before reconstruction:

C_Res_inv=(C_Res_scaled<<CSCALE_FP_PREC)/ cScale

C_Reco=C_Pred+C_Res_inv;

In an alternative embodiment, the operations for in-loop chroma reshaping may be expressed as follows. At the encoder side, for the residue (CxRes=CxOrg−CxPred) of chroma component Cx (e.g., Cb or Cr) of each CU or TU, $$CxResScaled = CxRes * cScale[\overline{Y_{CU}}], \quad (34)$$

where CxResScaled is the scaled Cb or Cr residue signal of the CU to be transformed and quantized. At the decoder side, CxResScaled is the scaled chroma residue signal after inverse quantization and transform, and $$CxRes = CxResScale/cScale[\overline{Y_{CU}}]. \quad (35)$$

The final reconstruction of chroma component is $$CxRec = CxPred + CxRes. \quad (36)$$

This approach allows the decoder to start inverse quantization and transform operations for chroma decoding immediately after syntax parsing. The cScale value being used for a CU may be shared by the Cb and Cr components, and from equations (29) and (30), it may be derived as:

$$cQPO[\overline{Y_{CU}}] = -6 * \log2(FwdLUT'[\overline{Y_{CU}}]) \quad (37)$$

$$cScale[\overline{Y_{CU}}] = FwdLUT'[\overline{Y_{CU}}] = 2^{\frac{-cQPO[\overline{Y_{CU}}]}{6}},$$

where $\overline{Y_{CU}}$ is the average predicted luma value of current CU in inter slices (where dual tree coding is not used and therefore reconstructed luma is not available), and $\overline{Y_{CU}}$ is the average reconstructed luma value of current CU in intra slices (where dual tree coding is used). In an embodiment, the scales are calculated and stored with 16-bit fixed point integers and the scaling operations at both the encoder and decoder side are implemented with fixed point integer arithmetic. FwdLUT'[$\overline{Y_{CU}}$] denotes the first derivative of the forward reshaping function. Assuming a piece-wise linear representation of the curve, then FwdLUT'(Y)=(CW[k]/32) when Y belongs to the k-th bin. To reduce hardware latency, in another embodiment (see FIG. 2E), $\overline{Y_{CU}}$ can use the average predicted luma value of the current CU for both intra and inter modes, regardless of the slice type and whether dual trees are used or not. In another embodiment, $\overline{Y_{CU}}$ can be derived using reconstructed CUs (such as those in the upper row and/or left column of the current CU) for intra and/or inter mode. In another embodiment, a region-based average, median, and the like, luma value or cScale value can be sent in the bitstream explicitly using high-level syntax.

Using cScale is not limited to chroma residue scaling for in-loop reshaping.

The same method can be applied for out-of-loop reshaping as well. In an out of loop reshaping, cScale may be used for chroma samples scaling. The operations are the same as in the in-loop approach.

At the encoder side, when computing the chroma RDOQ, the lambda modifier for chroma adjustment (either when using QP offset or when using chroma residue scaling) also needs to be calculated based on the refined offset:

Modifier=pow(2,−cQPO_refine/3);

New_lambda=Old_lambda/Modifier. (38)

As noted in equation (35), using cScale may require a division in the decoder. To simplify the decoder implementation, one may decide to implement the same functionality using a division in the encoder and apply a simpler multiplication in the decoder. For example, let cScaleInv=(1/cScale)

then, as an example, on an encoder cResScale=CxRes*cScale=CxRes/(1/cScale)=CxRes/cScaleInv, and on the decoder CxRes=cResScale/cScale=CxRes*(1/cScale)=CxRes*cScaleInv.

In an embodiment, each luma-dependent chroma scaling factor may be calculated for a corresponding luma range in the piece-wise linear (PWL) representation instead of for each luma codeword value. Thus, chroma scaling factors may be stored in a smaller LUT (e.g., with 16 or 32 entries), say, cScaleInv[binIdx], instead of the 1024-entry LUT (for 10-bit Luma codewords) (say, cScale[Y]). The scaling operations at both the encoder and the decoder side may be implemented with fixed point integer arithmetic as follows:

$c'=\text{sign}(c)*((\text{abs}(c)*s+2^{CSCALE\_FP\_PREC-1})>>CSCALE\_FP\_PREC)$, where c is the chroma residual, s is the chroma residual scaling factor from cScaleInv[binIdx], binIdx is decided by the corresponding average luma value, and CSCALE_FP_PREC is a constant value related to precision.

In an embodiment, while the forward reshaping function may be represented using N equal segments (e.g., N=8, 16, 32, and the like), the inverse representation will comprise non-linear segments. From an implementation point of view, it is desirable to have a representation of the inverse reshaping function using equal segments as well; however, forcing such a representation may cause loss in coding efficiency. As a compromise, in an embodiment one may be able to construct an inverse reshaping function with a "mixed" PWL representation, combining both equal and unequal segments. For example, when using 8 segments, one may first divide the whole range to two equal segments, and then subdivide each of these into 4 unequal segments. Alternatively, one may divide the whole range into 4 equal segments and then subdivide each one into two unequal segments. Alternatively, one may first divide the whole range into several unequal segments, then subdivide each unequal segment into multiple equal segments. Alternatively, one may first divide the whole range into two equal segments, and then subdivide each equal segment into equal sub-segments, where the segment length in each group of sub-segments is not the same.

For example, without limitation, with 1,024 codewords, one could have: a) 4 segments with 150 codewords each and two segments with 212 codewords each, or b) 8 segments with 64 codewords each and 4 segments with 128 codewords each. The general purpose of such a combination of segments is to reduce the number of comparisons required to identify the PWL-piece index given a code value, thus simplifying hardware and software implementations.

In an embodiment, for a more efficient implementation related to chroma residue scaling, the following variations may be enabled:

Disable the chroma residual scaling when separate luma/chroma trees are used

Disable the chroma residual scaling for 2×2 chroma; and

Figure 2F:
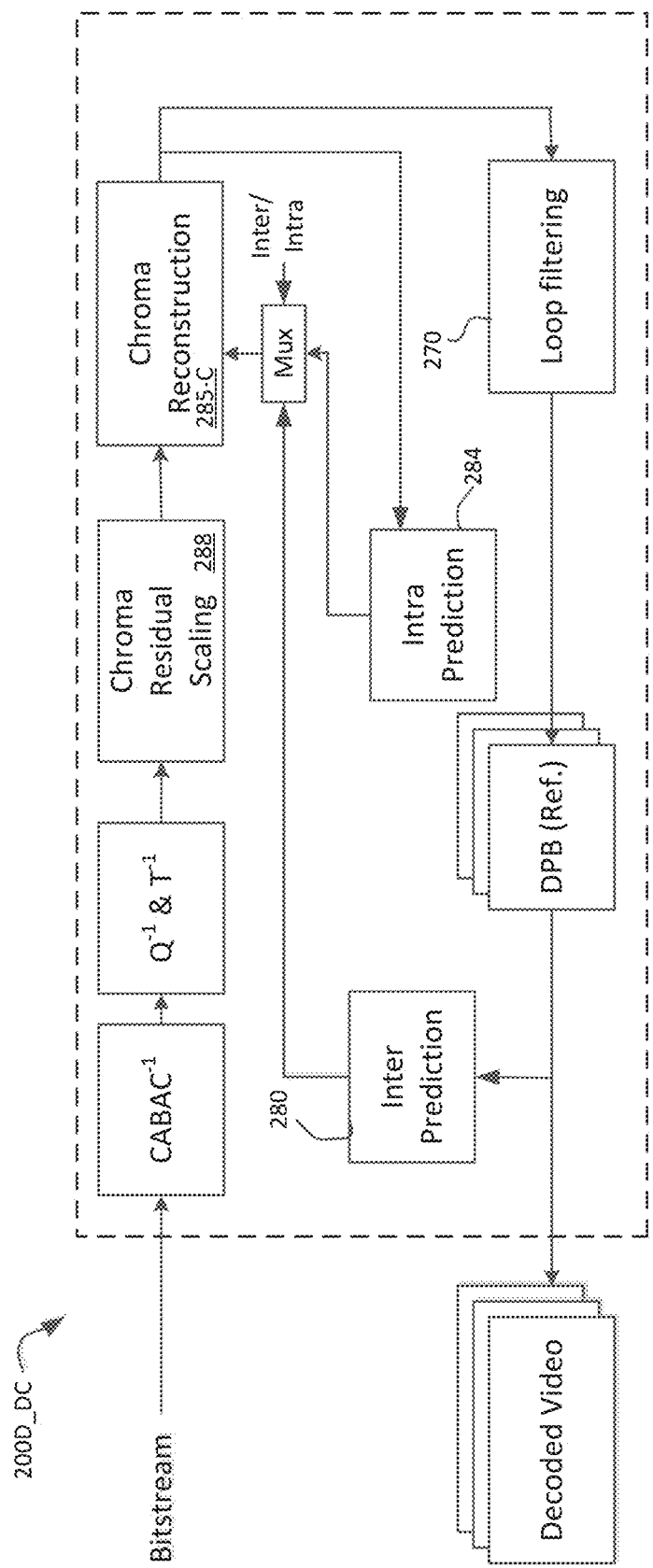
FIG. 2F depicts an example architecture for intra-CU decoding within inter-coded slices according to an embodiment for chroma processing.

Use the prediction signal rather than the reconstruction signal for intra as well as inter coded units As an example, given the decoder depicted in FIG. 2E (200D_D) to process the luma component, FIG. 2F depicts an example architecture (200D_DC) for processing the corresponding chroma samples.

As depicted in FIG. 2F, compared to FIG. 2E, the following changes are made when processing chroma:

The forward and reverse reshaping blocks (282 and 265-3) are not used

There is a new Chroma residual scaling block (288), in effect replacing the inverse reshaping block for luma (265-3); and The reconstruction block (285-C) is modified to handle color residuals in the original domain, as described in equation (36): CxRec=CxPred+CxRes.

From equation (34), at the decoder side, let CxResScaled denote the extracted scaled chroma residual signal after inverse quantization and transform (before block 288), and let $CxRes = CxResScaled * C_{ScaleInv}$ denote the rescaled chroma residual generated by the Chroma Residual scaling block (288) to be used by the reconstruction unit (285-C) to compute CxRec=CxPred+CxRes, where CxPred is generated either by the Intra (284) or Inter (280) Prediction blocks.

The $C_{ScaleInv}$ value being used for a Transform Unit (TU) may be shared by the Cb and Cr components and can be computed as follows:

If in intra mode, then compute the average of intra predicted luma values;

if in inter mode, then compute the average of forward reshaped inter-predicted luma values. That is, the average luma value $avgY'_{TU}$ is computed in the reshaped domain; and If in combined merge and intra prediction, then compute the average of combined predicted luma values. For example, the combined predicted luma values may be computed according to Appendix 2, section 8.4.6.6.

In an embodiment, one can apply a LUT to compute $C_{ScaleInv}$ based on $avgY'_{TU}$. Alternatively, given a piece-wise-linear (PWL) representation of the reshaping function one may find the index idx where the value $avgY'_{TU}$ belongs to in the inverse-mapping PWL.

Then, $C_{ScaleInv}$=cScaleInv[idx]

An example implementation, as it is applicable to the Versatile Video Coding codec (Ref. [8]), currently under development by ITU and ISO, can be found in Appendix 2 (e.g., see Section 8.5.5.1.2).

Disabling luma-based chroma residual scaling for intra slices with dual trees may cause some loss in coding efficiency. To improve the effects of chroma reshaping, the following methods may be used:
1. The chroma scaling factor may be kept the same for the entire frame depending on the average or median of the luma sample values. This will remove the TU-level dependency on luma for chroma residue scaling.
2. Chroma scaling factors can be derived using reconstructed luma values from the neighboring CTUs.
3. An encoder can derive the chroma scaling factor based on source luma pixels and send it in the bitstream at the CU/CTU level (e.g., as an index to the piece-wise representation of the reshaping function). Then, the decoder may extract the chroma scaling factor from the reshaping function without depending on luma data.
   The scale factor for a CTU can be derived and sent only for Intra slices; but can be used for Inter slices as well. The additional signaling cost occurs only for Intra slices, thus having no impact in coding efficiency in random access.
4. Chroma can be reshaped at the frame level as luma, with the chroma reshaping curve being derived from the luma reshaping curve based on a correlation analysis between luma and chroma. This eliminates chroma residue scaling completely.

delta_qp Application

In AVC and HEVC, the parameter delta_qp is allowed to modify the QP value for a coding block. In an embodiment, one can use the luma curve in the reshaper to derive the delta_qp value. One can derive a piece-wise lumaDQP value based on the codeword assignment for each bin. For example:
for the k-th bin, $$\text{scale}_k = (M_k/M_a); \quad (39)$$

$$\text{lumaDQP}_k = \text{INT}(6 * \log 2(\text{scale}_k)),$$

where INTO can be CEIL( ), ROUND( ) or FLOOR( ). The encoder can use a function of luma, e.g., average(luma), min(luma), max(luma), and the like, to find the luma value for that block, then use the corresponding lumaDQP value for that block. To get the rate-distortion benefit, from equation (27), one can use weighted distortion in mode decision and set $$W_{rsp}(k) = \text{scale}_k^2.$$

Reshaping and Considerations for the Number of Bins

In typical 10-bit video coding, it is preferable to use at least 32 bins for the reshaping mapping; however, to simplify the decoder implementation, in an embodiment, one may use fewer bins, say 16, or even 8 bins. Given that an encoder may already being using 32 bins to analyze the sequence and derive the distribution codeword, one can reuse the original 32-bin codeword distribution and derive the 16 bins-codewords by adding the corresponding two 16-bins inside each 32 bins, i.e., for $i$=0 to 15

$$\text{CWIn16Bin}[i] = \text{CWIn32Bin}[2i] + \text{CWIn32Bin}[2i+1].$$

For the chroma residue scaling factor, one can simply divide the codeword by 2, and point to the 32-bins chromaScalingFactorLUT. For example, given CWIn32Bin[32]={0 0 33 38 38 38 38 38 38 38 38 38 38 38 38 38 33 33 33 33 33 33 33 33 33 33 33 33 0 0}, the corresponding 16-bins CW allocation is CWIn16Bin[16]={0 71 76 76 76 76 76 76 71 66 66 66 66 66 66 0}.

This approach can be extended to handle even fewer bins, say 8, then, for $i$=0 to 7

$$\text{CWIn8Bin}[i] = \text{CWIn16Bin}[2i] + \text{CWIn16Bin}[2i+1].$$

When using a narrow range of valid codewords (e.g., [64, 940] for 10-bit signals and [64, 235] for 8-bit signals), care should be taken that the first and last bin do not consider mapping to reserved codewords. For example, for a 10-bit signal, with 8 bins, each bin will have 1024/8=128 codewords, and the first bin will be [0, 127]; however, since the standard codeword range is [64, 940], the first bin should only consider codewords [64, 127]. A special flag, (e.g., video_full_range_flag=0) may be used to notify the decoder that the input video has a narrower range than the full range [0, $2^{bitdepth}-1$] and that special care should be taken to not generate illegal codewords when processing the first and last bins. This is applicable to both luma and chroma reshaping.

As an example, and without limitation, Appendix 2 provides an example syntax structure and associated syntax elements to support reshaping in the ISO/ITU Video Versatile Codec (VVC) (Ref. [8]) according to an embodiment using the architectures depicted in FIG. 2C, FIG. 2E, and FIG. 2F, where the forward reshaping function comprises 16 segments.

REFERENCES

Each one of the references listed herein is incorporated by reference in its entirety.

[1] "*Exploratory Test Model for HDR extension of HEVC*", K. Minoo et al., MPEG output document, JCTVC-W0092 (m37732), 2016, San Diego, USA.

[2] PCT Application PCT/US2016/025082, In-Loop Block-Based Image Reshaping in High Dynamic Range Video Coding, filed on Mar. 30, 2016, also published as WO 2016/164235, by G-M. Su. [3] U.S. patent application Ser. No. 15/410,563, Content-Adaptive Reshaping for High Codeword representation Images, filed on Jan. 19, 2017, by T. Lu et al.

[4] ITU-T H.265, "High efficiency video coding," ITU, December 2016.

[5] PCT Application PCT/US2016/042229, Signal Reshaping and Coding for HDR and Wide Color Gamut Signals, filed on Jul. 14, 2016, also published as WO 2017/011636, by P. Yin et al.

[6] PCT Patent Application PCT/US2018/040287, Integrated Image Reshaping and Video Coding, filed on Jun. 29, 2018, by T. Lu et al.

[7] J. Froehlich et al., "Content-Adaptive Perceptual Quantizer for High Dynamic Range Images," U.S. Patent Application Publication Ser. No. 2018/0041759, Feb. 8, 2018.

[8] B. Bross, J. Chen, and S. Liu, "*Versatile Video Coding (Draft 3),*" JVET output document, JVET-L1001, v9, uploaded, Jan. 8, 2019.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to signal reshaping and coding of images, such as those described herein. The computer and/or IC may compute any of a variety of parameters or values that relate to the signal reshaping and coding processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to signal reshaping and coding of images as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient signal reshaping and coding of images are thus described. In the foregoing specification, embodiments of the present invention have been described with reference to numerous specific details that may vary from implementation to implementation. Thus, the sole and exclusive indicator of what is the invention and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Appendix 1

Example Implementation of Bubble Sort.

```
void bubbleSortDsd(double* array, int * idx, int n)
{
  int i, j;
  bool swapped;
  for (i = 0; i < n - 1; i++)
  {
    swapped = false;
    for (j = 0; j < n - i - 1; j++)
    {
      if (array[j] < array[j + 1])
      {
        swap(&array[j], &array[j + 1]);
        swap(&idx[j], &idx[j + 1]);
        swapped = true;
      }
    }
    if (swapped == false)
      break;
  }
}
```

Appendix 2

As an example, this Appendix provides an example syntax structure and associated syntax elements according to an embodiment to support reshaping in the Versatile Video Codec (VVC) (Ref. [8]), currently under joint development by ISO and ITU. New syntax elements in the existing draft version are either in an italic font or explicitly noted. Equation numbers like (8-xxx) denote placeholders to be updated, as needed, in the final specification.

In 7.3.2.1 Sequence Parameter Set RBSP Syntax

| seq_parameter_set_rbsp( ) { | Descriptor |
|---|---|
| sps_seq_parameter_set_id | ue(v) |
| intra_only_constraint_flag | u(1) |
| max_bitdepth_constraint_idc | u(4) |
| max_chroma_format_constraint_idc | u(2) |
| frame_only_constraint_flag | u(1) |
| no_qtbff_dual_tree_intra constraint_flag | u(1) |
| no_sao_constraint_flag | u(1) |
| no_alf_constraint_flag | u(1) |
| no_pcm_constraint_flag | u(1) |
| no_temporal_mvp_constraint_flag | u(1) |
| no_sbtmvp_constraint_flag | u(1) |
| no_amvr_constraint_flag | u(1) |
| no_cclm_constraint_flag | u(1) |
| no_affine_motion_constraint_flag | u(1) |
| no_ladf_constraint_flag | u(1) |
| no_dep_quant_constraint_flag | u(1) |
| no_sign_data_hiding_constraint_flag | u(1) |
| chroma_format_idc | ue(v) |
| if( chroma_format_idc == 3 ) | |
|    separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| log2_max_pic_order_cnt_lsb_minus4 | ue(v) |
| qtbff_dual_tree_intra_flag | ue(v) |
| log2_ctu_size_minus2 | ue(v) |
| log2_min_luma_coding_block_size_minus2 | ue(v) |
| partition_constraints_override_enabled_flag | ue(v) |
| sps_log2_diff_min_qt_min_cb_intra_tile_group_luma | ue(v) |
| sps_log2_diff_min_qt_min_cb_inter_tile_group | ue(v) |
| sps_max_mtt_hierarchy_depth_inter_tile_groups | ue(v) |
| sps_max_mtt_hierarchy_depth_intra_tile_groups_luma | ue(v) |
| if( sps_max_mtt_hierarchy_depth_intra_tile_groups_luma != 0 ) { | |

| seq_parameter_set_rbsp( ) { | Descriptor |
|---|---|
|     sps_log2_diff_max_bt_min_qt_intra_tile_group_luma | ue(v) |
|     sps_log2_diff_max_tt_min_qt_intra_tile_group_luma | ue(v) |
|   } | |
|   if( sps_max_mtt_hierarchy_depth_inter_tile_groups != 0 ) { | |
|     sps_log2_diff_max_bt_min_qt_inter_tile_group | ue(v) |
|     sps_log2_diff_max_tt_min_qt_inter_tile_group | ue(v) |
|   } | |
|   if( qtbtt_dual_tree_intra_flag ) { | |
|     sps_log2_diff_min_qt_min_cb_intra_tile_group_chroma | ue(v) |
|     sps_max_mtt_hierarchy_depth_intra_tile_groups_chroma | ue(v) |
|     if ( sps_max_mtt_hierarchy_depth_intra_tile_groups_chroma != 0 ) { | |
|       sps_log2_diff_max_bt_min_qt_intra_tile_group_chroma | ue(v) |
|       sps_log2_diff_max_tt_min_qt_intra_tile_group_chroma | ue(v) |
|     } | |
|   } | |
|   sps_sao_enabled_flag | u(1) |
|   sps_alf_enabled_flag | u(1) |
|   pcm_enabled_flag | u(1) |
|   if( pcm_enabled_flag ) { | |
|     pcm_sample_bit_depth_luma_minus1 | u(4) |
|     pcm_sample_bit_depth_chroma_minus1 | u(4) |
|     log2_min_pcm_luma_coding_block_size_minus3 | ue(v) |
|     log2_diff_max_min_pcm_luma_coding_block_size | ue(v) |
|     pcm_loop_filter_disabled_flag | u(1) |
|   } | |
|   sps_ref_wraparound_enabled_flag | u(1) |
|   if( sps_ref_wraparound_enabled_flag ) | |
|     sps_ref_wraparound_offset | ue(v) |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   sps_bdof_enabled_flag | u(1) |
|   sps_cclm_enabled_flag | u(1) |
|   sps_mts_intra_enabled_flag | u(1) |
|   sps_mts_inter_enabled_flag | u(1) |
|   sps_affine_enabled_flag | u(1) |
|   if( sps_affine_enabled_flag ) | |
|     sps_affine_type_flag | u(1) |
|   sps_gbi_enabled_flag | u(1) |
|   sps_cpr_enabled_flag | u(1) |
|   sps_ciip_enabled_flag | u(1) |
|   sps_triangle_enabled_flag | u(1) |
|   sps_ladf_enabled_flag | u(1) |
|   if ( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|       sps_ladf_qp_offset[ i ] | se(v) |
|       sps_ladf_delta_threshold_minus1[ i ] | ue(v) |
|     } | |
|   } | |
|   sps_reshaper_enabled_flag | u(1) |
|   rbsp_trailing_bits( ) | |
| } | |

In 7.3.3.1 General Tile Group Header Syntax

| tile_group_header( ) { | Descriptor |
|---|---|
|   tile_group_pic_parameter_set_id | ue(v) |
|   if( NumTilesInPic > 1 ) { | |
|     tile_group_address | u(v) |
|     num_tiles_in_tile_group_minus1 | ue(v) |
|   } | |
|   tile_group_type | ue(v) |
|   tile_group_pic_order_cnt_lsb | u(v) |
|   if( partition_constraints_override_enabled_flag ) { | |
|     partition_constraints_override_flag | ue(v) |
|     if( partition_constraints_override_flag ) { | |

| tile_group_header( ) { | Descriptor |
|---|---|
|       tile_group_log2_diff_min_qt_min_cb_luma | ue(v) |
|       tile_group_max_mtt_hierarchy_depth_luma | ue(v) |
|       if( tile_group_max_mtt_hierarchy_depth_luma != 0 ) { | |
|         tile_group_log2_diff_max_bt_min_qt_luma | ue(v) |
|         tile_group_log2_diff_max_tt_min_qt_luma | ue(v) |
|       } | |
|       if( tile_group_type == I && qtbtt_dual_tree_intra_flag ) { | |
|         tile_group_log2_diff_min_qt_min_cb_chroma | ue(v) |
|         tile_group_max_mtt_hierarchy_depth_chroma | ue(v) |
|         if( tile_group_max_mtt_hierarchy_depth_chroma != 0 ) | |
|           tile_group_log2_diff_max_bt_min_qt_chroma | ue(v) |
|           tile_group_log2_diff_max_tt_min_qt_chroma | ue(v) |
|         } | |
|       } | |
|     } | |
|   } | |
|   if ( tile_group_type != I ) { | |
|     if( sps_temporal_mvp_enabled_flag ) | |
|       tile_group_temporal_mvp_enabled_flag | u(1) |
|     if( tile_group_type == B ) | |
|       mvd_l1_zero_flag | u(1) |
|     if( tile_group_temporal_mvp_enabled_flag ) { | |
|       if( tile_group_type == B ) | |
|         collocated_from_l0_flag | u(1) |
|     } | |
|     six_minus_max_num_merge_cand | ue(v) |
|     if( sps_affine_enable_flag ) | |
|       five_minus_max_num_subblock_merge_cand | ue(v) |
|   } | |
|   tile_group_qp_delta | se(v) |
|   if( pps_tile_group_chroma_qp_offsets_present_flag ) { | |
|     tile_group_cb_qp_offset | se(v) |
|     tile_group_cr_qp_offset | se(v) |
|   } | |
|   if( sps_sao_enabled_flag ) { | |
|     tile_group_sao_luma_flag | u(1) |
|     if( ChromaArrayType != 0 ) | |
|       tile_group_sao_chroma_flag | u(1) |
|   } | |
|   if( sps_alf_enabled_flag ) { | |
|     tile_group_alf_enabled_flag | u(1) |
|     if( tile_group_alf_enabled_flag ) | |
|       alf_data( ) | |
|   } | |
|   if( tile_group_type == P || tile_group_type == B ) { | |
|     num_ref_idx_l0_active_minus1 | ue(v) |
|     if( tile_group_type == B ) | |
|       num_ref_idx_l1_active_minus1 | ue(v) |
|   } | |
|   dep_quant_enabled_flag | u(1) |
|   if( !dep_quant_enabled_flag ) | |
|     sign_data_hiding_enabled_flag | u(1) |
|   if( deblocking_filter_override_enabled_flag ) | |
|     deblocking_filter_override_flag | u(1) |
|   if( deblocking_filter_override_flag ){ | |
|     tile_group_deblocking_filter_disabled_flag | u(1) |
|     if( !tile_group_deblocking_filter_disabled_flag ) { | |
|       tile_group_beta_offset_div2 | se(v) |
|       tile_group_tc_offset_div2 | se(v) |
|     } | |
|   } | |
|   if( num_tiles_in_tile_group_minus1 > 0 ) { | |
|     offset_len_minus1 | ue(v) |
|     for( i = 0; i < num_tiles_in_tile_group_minus1; i++ ) | |
|       entry_point_offset_minus1[ i ] | u(v) |
|   } | |
|   if ( sps_reshaper_enabled_flag ) { | |
|     tile_group_reshaper_model_present_flag | u(1) |
|     if ( tile_group_reshaper_model_present_flag ) | |
|       tile_group_reshaper_model ( ) | |
|     tile_group_reshaper_enable_flag | u(1) |
|     if( tile_group_reshaper_enable_flag && (!( qtbtt_dual_tree_intra_flag && tile_group_type == I ) ) ) | |

-continued

| tile_group_header( ) { | Descriptor |
|---|---|
|     tile_group_reshaper_chroma_residual_scale_flag | u(1) |
| } | |
| byte_alignment( ) | |
| } | |

Add a New Syntax Table Tile Group Reshaper Model:

| tile_group_reshaper_model ( ) { | Descriptor |
|---|---|
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   for ( i = reshaper_model_min_bin_idx; i <= reshaper_model_max_bin_idx; i++ ) { | |
|     reshaper_model_bin_delta_abs_CW [ i ] | u(v) |
|     if ( reshaper_model_bin_delta_abs_CW[ i ] ) > 0 ) | |
|       reshaper_model_bin_delta_sign_CW_flag[ i ] | u(1) |
|   } | |
| } | |

In General Sequence Parameter Set RBSP Semantics, Add the Following Semantics:
sps_reshaper_enabled_flag equal to 1 specifies that reshaper is used in the coded video sequence (CVS). sps_reshaper_enabled_flag equal to 0 specifies that reshaper is not used in the CVS.
In Tile Group Header Syntax, Add the Following Semantics tile_group_reshaper_model_present_flag equal to 1 specifies tile_group_reshaper_model( ) is present in tile group header. tile_group_reshaper_modelpresent_flag equal to 0 specifies tile_group_reshaper_model( ) is not present in tile group header. When tile_group_reshaper_model_present_flag is not present, it is inferred to be equal to 0. tile_group_reshaper_enabled_flag equal to 1 specifies that reshaper is enabled for the current tile group. tile_group_reshaper_enabled_flag equal to 0 specifies that reshaper is not enabled for the current tile group. When tile_group_reshaper_enable_flag is not present, it is inferred to be equal to 0. tile_group_reshaper_chroma_residual_scale_flag equal to 1 specifies that chroma residual scaling is enabled for the current tile group. tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.
Add tile_group_reshaper_model( )) Syntax
  reshaper_model_min_bin_idx specifies the minimum bin (or piece) index to be used in the reshaper construction process. The value of reshaper_model_min_bin_idx shall be in the range of 0 to MaxBinIdx, inclusive. The value of MaxBinIdx shall be equal to 15.
  reshaper_model_delta_max_bin_idx specifies the maximum allowed bin (or piece) index MaxBinIdx minus the maximum bin index to be used in the reshaper construction process. The value of reshaper_model_max_bin_idx is set equal to MaxBinIdx−reshaper_model_delta_max_bin_idx.
  reshaper_model_bin_delta_abs_cw_prec_minus1 plus 1 specifies the number of bits used for the representation of the syntax reshaper_model_bin_delta_abs_CW[i].
  reshaper_model_bin_delta_abs_CW[i] specifies the absolute delta codeword value for the i-th bin.
  reshaper_model_bin_delta_sign_CW_flag[i] specifies the sign of reshaper_model_bin_delta_abs_CW[i] as follows:

If reshaper_model_bin_delta_sign_CW_flag[i] is equal to 0, the corresponding variable RspDeltaCW[i] is a positive value.
Otherwise (reshaper_model_bin_delta_sign_CW_flag[i] is not equal to 0), the corresponding variable RspDeltaCW[i] is a negative value.
When reshaper_model_bin_delta_sign_CW_flag[i] is not present, it is inferred to be equal to 0.

The variable RspDeltaCW[$i$]=(1−2*reshaper_model_bin_delta_sign_CW[$i$])*reshaper_model_bin_delta_abs_CW[$i$];

The variable RspCW[i] is derived as following steps:
The variable OrgCW is set equal to (1<<BitDepth$_Y$)/(MaxBinIdx+1).
  If reshaper_model_min_bin_idx<=i<=reshaper_model_max_bin_idx RspCW[$i$]=OrgCW+RspDeltaCW[$i$].

Otherwise, RspCW[i]=0.
The value of RspCW[i] shall be in the range of 32 to 2*OrgCW−1 if the value of BitDepth$_Y$ is equal to 10.
The variables InputPivot[i] with i in the range of 0 to MaxBinIdx+1, inclusive are derived as follows InputPivot[$i$]=$i$*OrgCW The variable ReshapePivot[i] with i in the range of 0 to MaxBinIdx+1, inclusive, the variable ScaleCoef[i] and InvScaleCoeff[i] with i in the range of 0 to MaxBinIdx, inclusive, are derived as follows:

```
shiftY = 14
ReshapePivot[ 0 ] = 0;
for( i = 0; i <= MaxBinIdx ; i++) {
    ReshapePivot[ i + 1 ] = ReshapePivot[ i ] + RspCW[ i ]
    ScaleCoef[ i ] = ( RspCW[ i ] * (1 << shiftY) +
(1 << (Log2(OrgCW) − 1))) >> (Log2(OrgCW))
    if ( RspCW[ i ] == 0 )
        InvScaleCoeff[ i ] = 0
    else
        InvScaleCoeff[ i ] = OrgCW * (1 << shiftY) / RspCW[ i ]
}
```

The variable ChromaScaleCoef[i] with i in the range of 0 to MaxBinIdx, inclusive, are derived as follows:

ChromaResidualScaleLut[64]={16384, 16384,
16384, 16384, 16384, 16384, 16384, 8192,
8192, 8192, 8192, 8192, 5461, 5461, 5461, 5461,
4096, 4096, 4096, 4096, 3277, 3277, 3277,
3277, 2731, 2731, 2731, 2731, 2341, 2341,
2341, 2048, 2048, 2048, 1820, 1820, 1820,
1638, 1638, 1638, 1638, 1489, 1489, 1489,
1489, 1365, 1365, 1365, 1365, 1260, 1260,
1260, 1260, 1170, 1170, 1170, 1170, 1092,
1092, 1092, 1092, 1024, 1024, 1024, 1024};

shift$C$=11 if(RspCW[$i$]==0)

ChromaScaleCoef[$i$]=(1<<shift$C$)

Otherwise (RspCW[$i$]!=0),

ChromaScaleCoef[$i$]=ChromaResidualScaleLut[Clip3 (1,64,RspCW[$i$]>>1)−1]

Note: In an alternative implementation, one may unify the scaling for luma and chroma, thus eliminating the need for the ChromaResidualScaleLut[ ]. Then chroma scaling may be implemented as:

shiftC=11 if(RspCW[$i$]==0)

ChromaScaleCoef[$i$]=(1<<shiftC)

Otherwise (RspCW[$i$]!=0), the following applies:

BinCW=BitDepth$_Y$>10?(RspCW[$i$]>>(BitDepth$_Y$−10)):BitDepth$_Y$<10?(RspCW[$i$]<<(10BitDepth$_Y$)):RspCW[$i$];

ChromaScaleCoef[$i$]=OrgCW*(1<<shiftC)/BinCW[$i$].

Add the Following in Weighted Sample Prediction Process for Combined Merge and Intra Prediction. The Addition is in an Italic Font.
8.4.6.6 Weighted Sample Prediction Process for Combined Merge and Intra Prediction
Inputs to this process are:
 the width of the current coding block cbWidth,
 the height of the current coding block cbHeight,
 two (cbWidth)×(cbHeight) arrays predSamplesInter and predSamplesIntra,
 the intra prediction mode predModeIntra,
 a variable cIdx specifying the colour component index.
Output of this process is the (cbWidth)×(cbHeight) array predSamplesComb of prediction sample values.
The variable bitDepth is derived as follows:
 If cIdx is equal to 0, bitDepth is set equal to BitDepth$_Y$.
 Otherwise, bitDepth is set equal to BitDepth$_C$.
The prediction samples predSamplesComb[x][y] with x=0 ... cbWidth−1 and y=0 ... cbHeight−1 are derived as follows:
 The weight w is derived as follows:
  If predModeIntra is INTRA_ANGULAR50, w is specified in Table 8-10 with nPos equal to y and nSize equal to cbHeight.
  Otherwise, if predModeIntra is INTRA_ANGULAR18, w is specified in Table 8-10 with nPos equal to x and nSize equal to cbWidth.
  Otherwise, w is set equal to 4.
 If cIdx is equal to 0, predSamplesInter is derived as following:
  If tile_group_reshaper_enabled_flag is equal to 1, shiftY=14

*idxY*=predSamplesInter[x][y]>>Log 2(OrgCW)

predSamplesInter[x][y]=Clip1$_Y$(ReshapePivot[*idxY*]+(ScaleCoeff[*idxY*]*(predSamplesInter[x][y]−InputPivot[*idxY*])+(1<<(shiftY−1)))>>shiftY) (8-xxx)

Otherwise (tilegroup_reshaper_enabled_flag is equal to 0)

predSamplesInter[x][y]=predSamplesInter[x][y]

The prediction samples predSamplesComb[x][y] are derived as follows:

predSamplesComb[x][y]($w$*predSamplesIntra[x][y]+(8−$w$)*predSamplesInter[x][y])>>3) (8-740)

TABLE 8-10

Specification of w as a function of the position nP and the size nS

| 0 <= nP < (nS/4) | (nS/4) <= nP < (nS/2) | (nS/2) <= nP < (3*nS/4) | (3*nS/4) <= nP < nS |
|---|---|---|---|
| 6 | 5 | 3 | 2 |

Add the Following in Picture Reconstruction Process
8.5.5 Picture Reconstruction Process
Inputs to this process are:
 a location (xCurr, yCurr) specifying the top-left sample of the current block relative to the top-left sample of the current picture component,
 the variables nCurrSw and nCurrSh specifying the width and height, respectively, of the current block,
 a variable cIdx specifying the colour component of the current block,
 an (nCurrSw)×(nCurrSh) array predSamples specifying the predicted samples of the current block,
 an (nCurrSw)×(nCurrSh) array resSamples specifying the residual samples of the current block.
Depending on the value of the colour component cIdx, the following assignments are made:
 If cIdx is equal to 0, recSamples corresponds to the reconstructed picture sample array $S_L$ and the function clipCidx1 corresponds to Clip1$_Y$.
 Otherwise, if cIdx is equal to 1, recSamples corresponds to the reconstructed chroma sample array $S_{Cr}$ and the function clipCidx1 corresponds to Clip1$_C$.
 Otherwise (cIdx is equal to 2), recSamples corresponds to the reconstructed chroma sample array $S_{Cr}$ and the function clipCidx1 corresponds to Clip1$_C$.
When the Value of Tile_Group_Reshaper_Enabled_Flag is Equal to 1, the (nCurrSw)×(nCurrSh) Block of the Reconstructed Sample Array recSamples at Location (xCurr, yCurr) is Derived as the Mapping Process Specified in Clause 8.5.5.1.
Otherwise, the (nCurrSw)×(nCurrSh) block of the reconstructed sample array recSamples at location (xCurr, yCurr) is derived as follows:

recSamples[xCurr+$i$][yCurr+$j$]=clipCidx1(predSamples[$i$][$j$]+resSamples[$i$][$j$]) (8-xxx)

with $i$=0 ... nCurrSw−1, $j$=0 ... nCurrSh−1

8.5.5.1 Picture Reconstruction with Mapping Process
This clause specifies picture reconstruction with mapping process. The picture reconstruction with mapping process for luma sample value is specified in 8.5.5.1.1. The picture reconstruction with mapping process for chroma sample value is specified in 8.5.5.1.2.
8.5.5.1.1 Picture Reconstruction with Mapping Process for Luma Sample Value
Inputs to this process are:
 an (nCurrSw)×(nCurrSh) array predSamples specifying the luma predicted samples of the current block,
 an (nCurrSw)×(nCurrSh) array resSamples specifying the luma residual samples of the current block.
The output for this process are:
 an (nCurrSw)×(nCurrSh) mapped luma prediction sample array predMapSamples,
 an (nCurrSw)×(nCurrSh) reconstructed luma sample array recSamples.

The predMapSamples is derived as follows:
 If (CuPredMode[xCurr][yCurr]MODE_INTRA)||(Cu-PredMode[xCurr][yCurr]
 ==MODE_INTER&&mh_intra_flag[xCurr][yCurr])

$$predMapSamples[xCurr+i][yCurr+j]=predSamples[i][j] \quad (8\text{-}xxx)$$

with $i=0 \ldots nCurrSw-1, j=0 \ldots nCurrSh-1$

Otherwise ((CuPredMode[xCurr][yCurr] MODE_INTER&&!mh_intra_flag[xCurr][yCurr])), the following applies:

$$shiftY = 14$$
$$idxY = predSamples[i][j] >> \text{Log2}(OrgCW)$$
$$predSamples[xCurr + i][yCurr + j] = ReshapePivot[idxY] +$$
$$(ScaleCoeff[idxY] * (predSamples[i][j] - InputPivot[idxY]) +$$
$$(1 << (shiftY - 1))) >> shiftY \quad (8-xxx)$$
$$\text{with } i = 0 \ldots nCurrSw - 1, \ j = 0 \ldots nCurrSh - 1$$

The recSamples is derived as follows:

$$recSamples[xCurr+i][yCurr+j]=\text{Clip1}_Y(predMapSamples[xCurr+i][yCurr+j]+resSamples[i][j]) \quad (8\text{-}xxx)$$

with $i=0 \ldots nCurrSw-1, j=0 \ldots nCurrSh-1$ 8.5.5.1.2 Picture Reconstruction with Mapping Process for Chroma Sample Value
Inputs to this process are:
 an (nCurrSwx2)×(nCurrShx2) array mapped predMapSamples specifying the mapped luma predicted samples of the current block,
 an (nCurrSw)×(nCurrSh) array predSamples specifying the chroma predicted samples of the current block,
 an (nCurrSw)×(nCurrSh) array resSamples specifying the chroma residual samples of the current block.
The output for this process is reconstructed chroma sample array recSamples.
The recSamples is derived as follows:
If (!tile_group_reshaper_chroma_residual_scale_flag II ((nCurrSw)×(nCurrSh)<=4))

$$recSamples[xCurr+i][yCurr+j]=\text{Clip1}_C(predSamples[i][j]+resSamples[i][j]) \quad (8\text{-}xxx)$$

with $i=0 \ldots nCurrSw-1, j=0 \ldots nCurrSh-1$

Otherwise (tile_group_reshaper_chroma_residual_scale_flag && ((nCurrSw)×(nCurrSh)>4)), the following applies:
The variable varScale is derived as follows:
 1. invAvgLuma=Clip1$_Y$(($\Sigma_i\Sigma_j$ predMapSamples[(xCurr<<1)+i][(yCurr<<1)+j]+nCurrSw*nCurrSh*2)/ (nCurrSw*nCurrSh*4))
 2. The variable idxYInv is derived by involving the identification of piece-wise function index as specified in clause 8.5.6.2 with the input of sample value invAvgLuma.
 3. varScale=ChromaScaleCoef[idxYInv]

The recSamples is derived as follows:
 If tu_cbf_cIdx[xCurr][yCurr] equal to 1, the following applies:

$$shiftC=11$$

$$recSamples[xCurr+i][yCurr+j]=\text{ClipCidx1}(predSamples[i][j]+\text{Sign}(resSamples[i][j])*((\text{Abs}(resSamples[i][j])*varScale+(1<<(shiftC-1)))>>shiftC)) \quad (8\text{-}xxx)$$

with $i=0 \ldots nCurrSw-1, j=0 \ldots nCurrSh-1$

Otherwise (tu_cbf_cIdx[xCurr][yCurr] equal to 0)

$$recSamples[xCurr+i][yCurr+j]=\text{ClipCidx1}1(predSamples[i][j]) \quad (8\text{-}xxx)$$

with $i=0 \ldots nCurrSw-1, j=0 \ldots nCurrSh-1$ 8.5.6 Picture Inverse Mapping Process
This clause is invoked when the value of tile_group_reshaper_enabled_flag is equal to 1. The input is reconstructed picture luma sample array $S_L$ and the output is modified reconstructed picture luma sample array $S'_L$ after inverse mapping process.
The inverse mapping process for luma sample value is specified in 8.4.6.1.
8.5.6.1 Picture Inverse Mapping Process of Luma Sample Values
Inputs to this process is a luma location (xP, yP) specifying the luma sample location relative to the top-left luma sample of the current picture.
Outputs of this process is a inverse mapped luma sample value invLumaSample.
The value of invLumaSample is derived by applying the following ordered steps:
 1. The variables idxYInv is derived by invoking the identification of piece-wise function index as specified in clause 8.5.6.2 with the input of luma sample value $S_L[xP][yP]$.
 2. The value of reshapeLumaSample is derived as follows:

$shiftY=14$ $$invLumaSample=InputPivot[idxYInv]+(InvScaleCoeff[idxYInv]*(S_L[xP][yP]-ReshapePivot[idxYInv])+(1<<(shiftY-1)))>>shiftY \quad (8\text{-}xxx)$$

3. clipRange=((reshaper_model_min_bin_idx>0)&& (reshaper_model_max_bin_idx<MaxBinIdx));
  When clipRange is equal to 1, the following applies:

minVal=16<<(BitDepth$_Y$-8)

maxVal=235<<(BitDepth$_Y$-8)

invLumaSample=Clip3(minVal,maxVal,invLumaSample)

else (clipRange is equal to 0), the following applies:

invLumaSample=ClipCidx1(invLumaSample)

8.5.6.2 Identification of Piecewise Function Index for Luma Components
Inputs to this process are a luma sample value S.
Output of this process is an index idxS identifying the piece to which the sample S belongs. The variable idxS is derived as follows:

```
for( idxS = 0, idxFound = 0; idxS <= MaxBinIdx; idxS++ ) {
    if( (S < ReshapePivot [ idxS + 1 ] ) {
        idxFound = 1
        break
    }
}
```

Note, an alternative implementation to find the identification idxS is as following:

```
        if (S < ReshapePivot [ reshaper_model_min_bin_idx ])
            idxS = 0
        else if (S >= ReshapePivot [ reshaper_model_min_bin_idx ])
            idxS = MaxBinIdx
        else
            idxS = findIdx ( S, 0, MaxBinIdx + 1, ReshapePivot [ ] )
        function idx = findIdx (val, low, high, pivot[ ]) {
            if ( high - low <= 1 )
                idx = low
            else {
                mid = ( low + high) >> 1
                if (val < pivot [mid] )
                    high = mid
                else
                    low = mid
                idx = findIdx (val, low, high, pivot[ ])
            }
        }
```

What is claimed is:

1. A method to reconstruct coded video data with one or more processors, the method comprising:
 receiving a coded bitstream comprising one or more coded reshaped images in a reshaped codeword representation;
 receiving reshaping parameters for the one or more coded reshaped images in the coded bitstream, wherein the reshaping parameters comprise parameters to generate a forward reshaping function based on the reshaping parameters, wherein the forward reshaping function maps pixels of an image from an input codeword representation to the reshaped codeword representation, wherein the reshaping parameters comprise:
  a delta-index parameter to determine an active maximum bin index used for reshaping, wherein the active maximum bin index is smaller or equal to a predefined maximum bin index, wherein the delta-index parameter represents a difference between the active maximum bin index and the predefined maximum bin index;
  a min-index parameter indicating a minimum bin index being used in the reshaping;
  absolute delta codeword values for each active bin used in the reshaping; and
  signs of the absolute delta codeword values for each active bin used in the reshaping.

2. The method of claim 1, wherein the forward reshaping function is reconstructed as a piece-wise linear function with linear segments derived by the reshaping parameters.

3. The method of claim 1, wherein determining the active maximum bin index used for representing the input codeword representation comprises computing a difference between the predefined maximum bin index and the delta-index parameter.

4. The method of claim 1, wherein the predefined maximum bin index is one of 15, 31, or 63.

5. A method to generate reshaping parameters for an encoded bitstream, the method comprising:
 receiving a sequence of video pictures in an input codeword representation;
 for one or more pictures in the sequence of video pictures applying a forward reshaping function to generate reshaped pictures in a reshaped codeword representation, wherein the forward reshaping function maps pixels of an image from the input codeword representation to the reshaped codeword representation;
 generating reshaping parameters for the reshaped codeword representation; and
 generating a coded bitstream based at least on the reshaped pictures, wherein the reshaping parameters comprise:
  a delta-index parameter to determine an active maximum bin index used for reshaping, wherein the active maximum bin index is smaller or equal to a predefined maximum bin index, wherein the delta-index parameter represents a difference between the active maximum bin index and the predefined maximum bin index;
  a min-index parameter indicating a minimum bin index being used in the reshaping;
  absolute delta codeword values for each active bin used in the reshaping; and
  signs of the absolute delta codeword values for each active bin used in the reshaping.

6. The method of claim 5, wherein the forward reshaping function comprises a piece-wise linear function with linear segments derived by the reshaping parameters.

7. The method of claim 5, wherein determining the active maximum bin index used for representing the input codeword representation comprises computing a difference between the predefined maximum bin index and the delta-index parameter.

8. The method of claim 5, wherein the predefined maximum bin index is one of 15, 31, or 63.

9. An apparatus comprising:
 a processor;
 one or more non-transitory computer-readable media storing instructions for generating and recording a bitstream in a recording medium, the instructions, when executed by the processor, causing the processor to perform a video encoding method to generate the bitstream,
 the encoding method comprising:
 receiving a sequence of video pictures in an input codeword representation;
 for one or more pictures in the sequence of video pictures applying a forward reshaping function to generate reshaped pictures in a reshaped codeword representation, wherein the forward reshaping function maps pixels of an image from the input codeword representation to the reshaped codeword representation;
 generating reshaping parameters for the reshaped codeword representation; and
 generating a coded bitstream based at least on the reshaped pictures, wherein the reshaping parameters comprise:
  a delta-index parameter to determine an active maximum bin index used for reshaping, wherein the active maximum bin index is smaller or equal to a predefined maximum bin index, wherein the delta-index parameter represents a difference between the active maximum bin index and the predefined maximum bin index;
  a min-index parameter indicating a minimum bin index being used in the reshaping;
  absolute delta codeword values for each active bin used in the reshaping; and
  signs of the absolute delta codeword values for each active bin used in the reshaping.

10. The apparatus of claim 9, wherein the forward reshaping function comprises a piece-wise linear function with linear segments derived by the reshaping parameters.

11. The apparatus of claim 9, wherein determining the active maximum bin index used for representing the input codeword representation comprises computing a difference between the predefined maximum bin index and the delta-index parameter.

12. The apparatus of claim 9, wherein the predefined maximum bin index is one of 15, 31, or 63.

13. One or more non-transitory computer-readable media storing instructions for generating and recording a bitstream in a recording medium, the instructions, when executed by the processor, causing the processor to perform a video encoding method to generate the bitstream, the encoding method comprising:

receiving a sequence of video pictures in an input codeword representation;

for one or more pictures in the sequence of video pictures applying a forward reshaping function to generate reshaped pictures in a reshaped codeword representation, wherein the forward reshaping function maps pixels of an image from the input codeword representation to the reshaped codeword representation;

generating reshaping parameters for the reshaped codeword representation; and generating a coded bitstream based at least on the reshaped pictures, wherein the reshaping parameters comprise:

a delta-index parameter to determine an active maximum bin index used for reshaping, wherein the active maximum bin index is smaller or equal to a predefined maximum bin index, wherein the delta-index parameter represents a difference between the active maximum bin index and the predefined maximum bin index;

a min-index parameter indicating a minimum bin index being used in the reshaping;

absolute delta codeword values for each active bin used in the reshaping; and signs of the absolute delta codeword values for each active bin used in the reshaping.

* * * * *